J. E. GRIFFITH.
GRAIN SHOCKING MACHINE.
APPLICATION FILED MAR. 22, 1912.

1,080,438.

Patented Dec. 2, 1913.
13 SHEETS—SHEET 1.

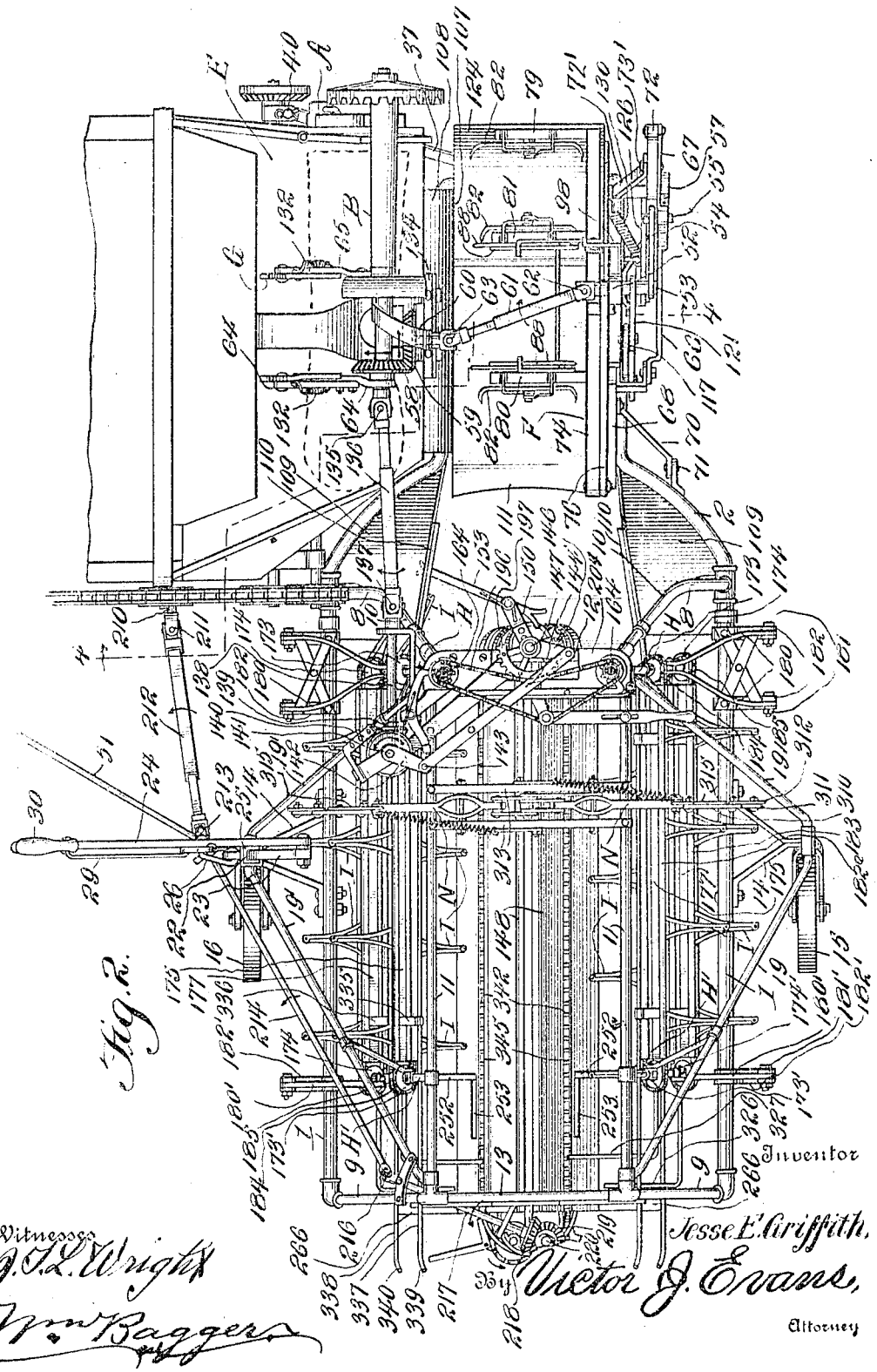

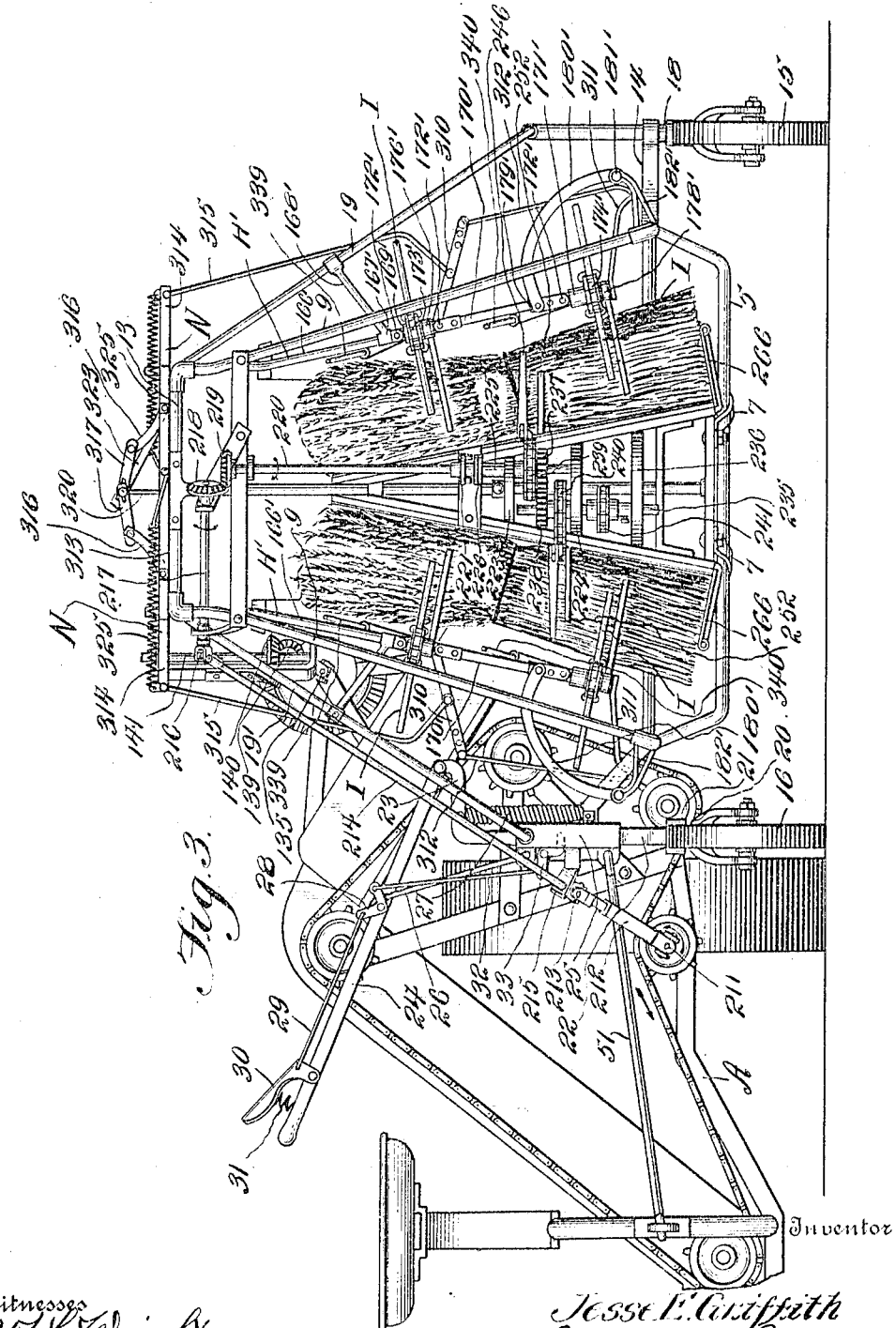

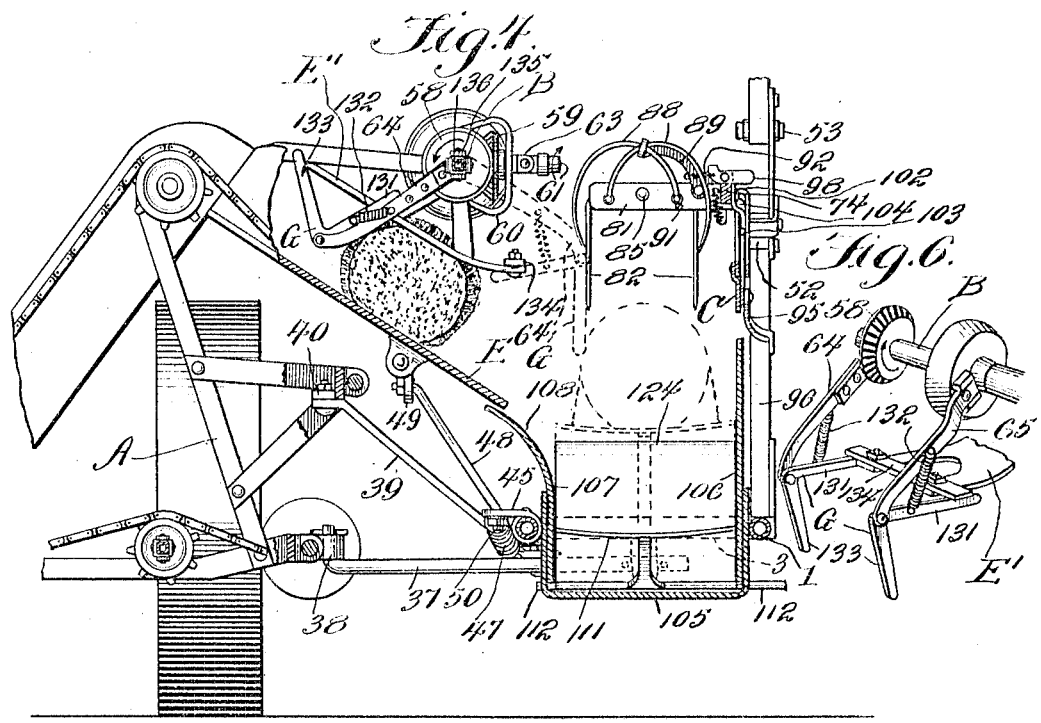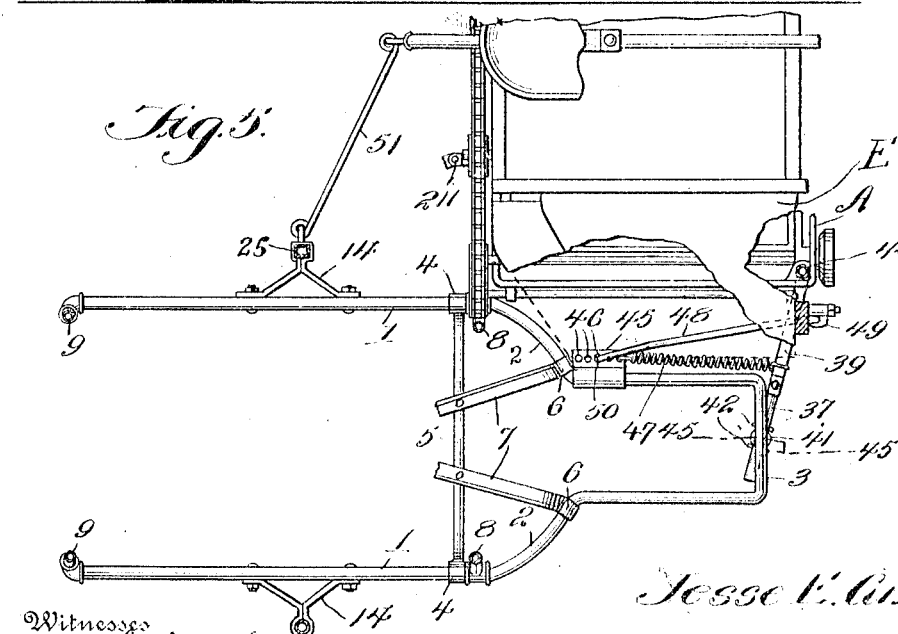

J. E. GRIFFITH.
GRAIN SHOCKING MACHINE.
APPLICATION FILED MAR. 22, 1912.
1,080,438.
Patented Dec. 2, 1913.
13 SHEETS—SHEET 5.
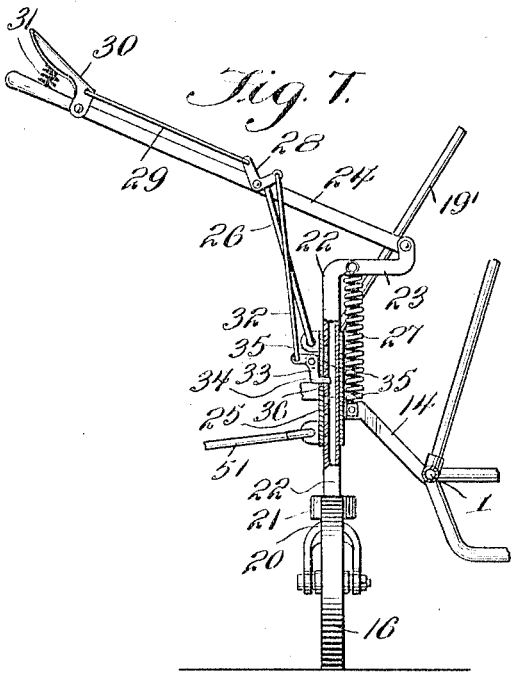
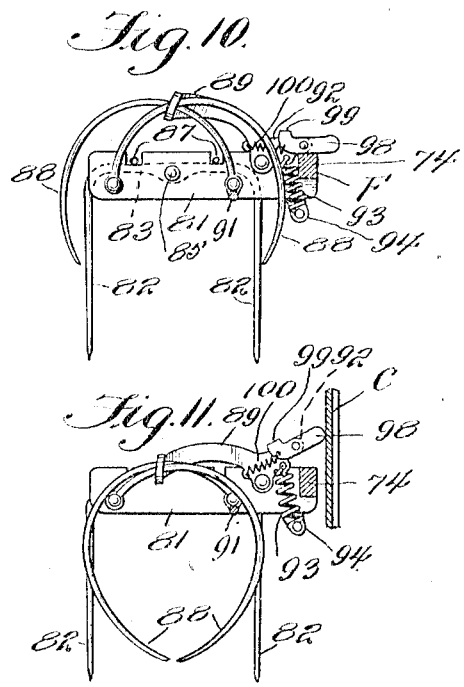
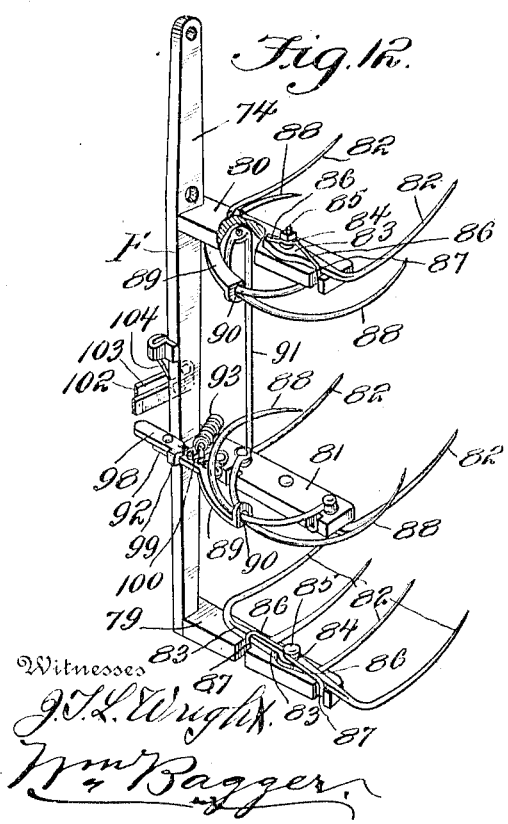
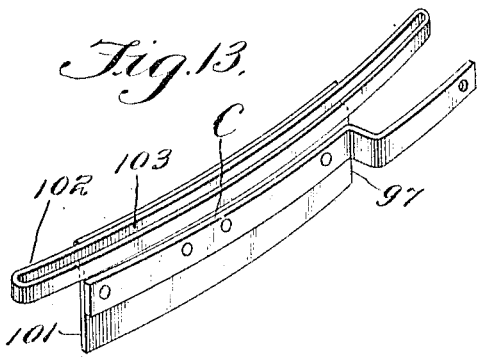
Inventor
Jesse E. Griffith,
By Victor J. Evans
Attorney
Witnesses
J. L. Wright
Wm. Bagger

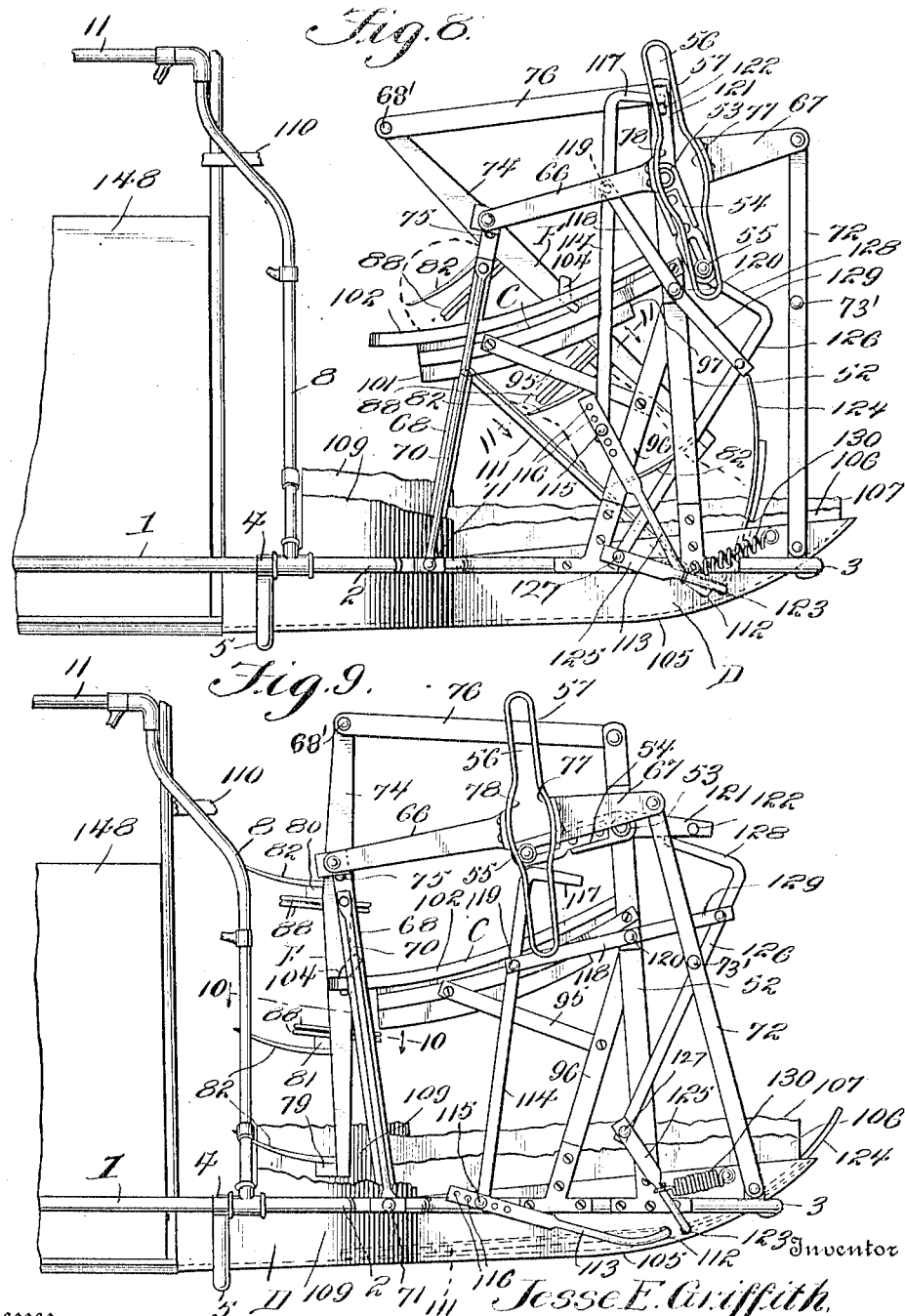

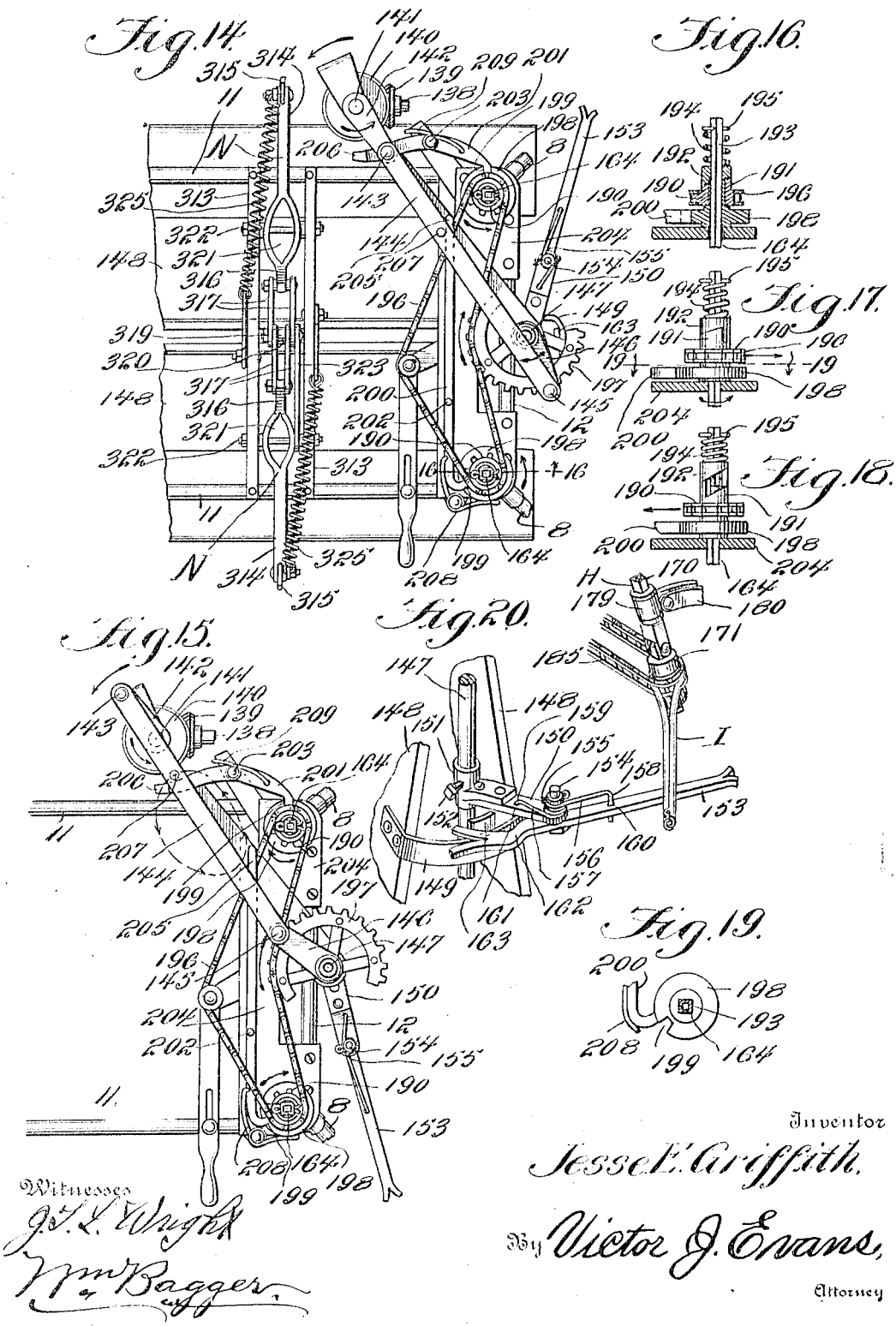

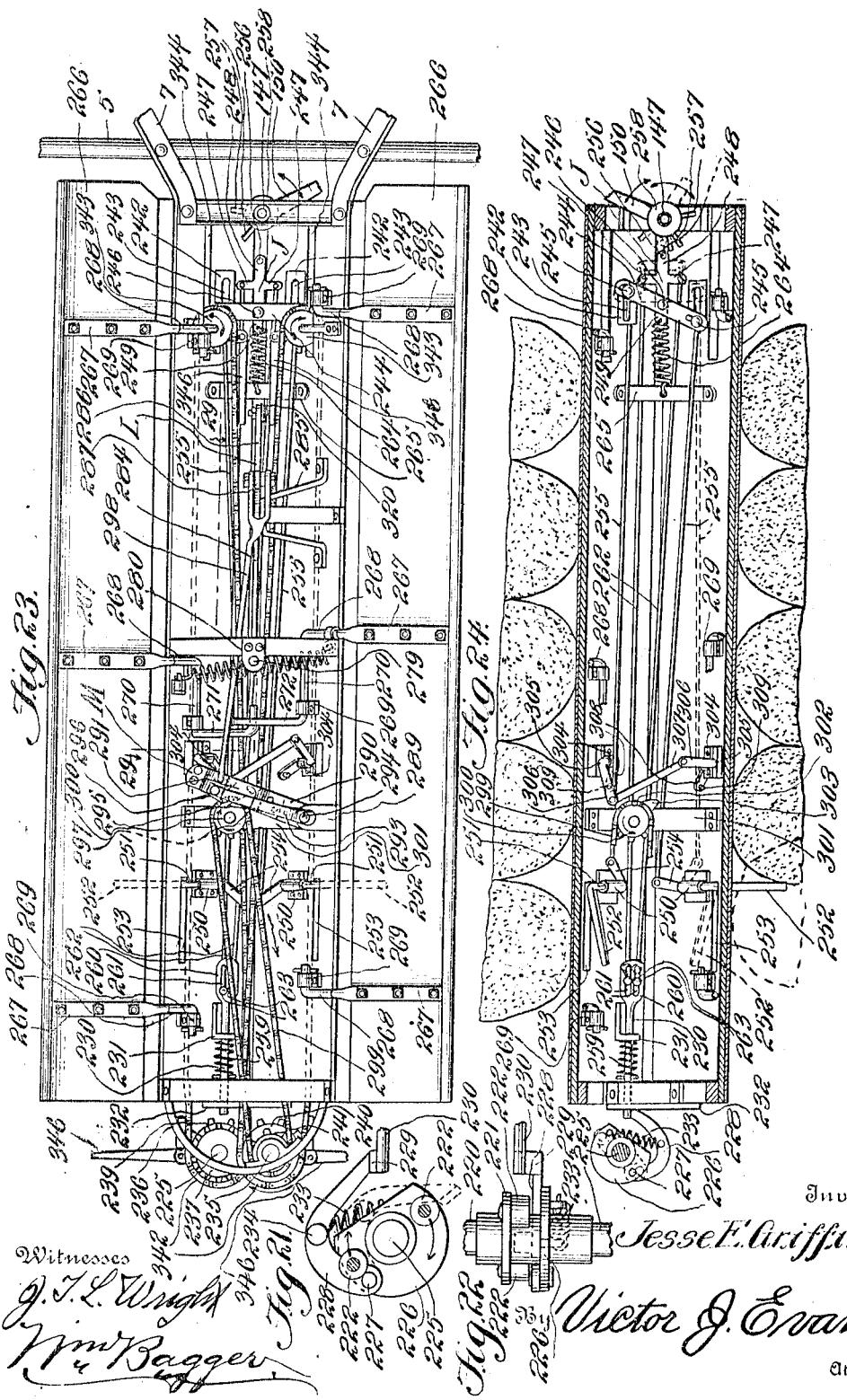

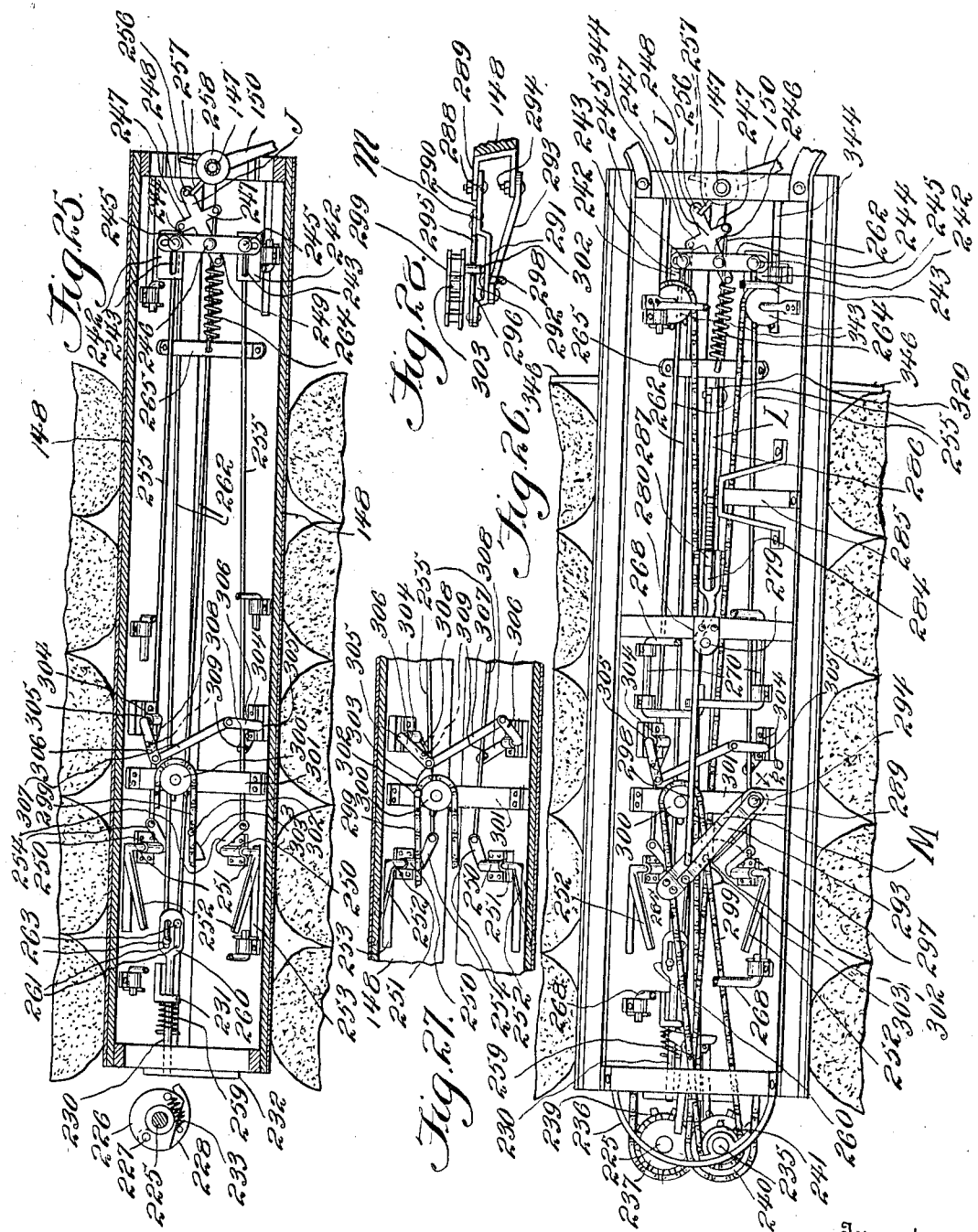

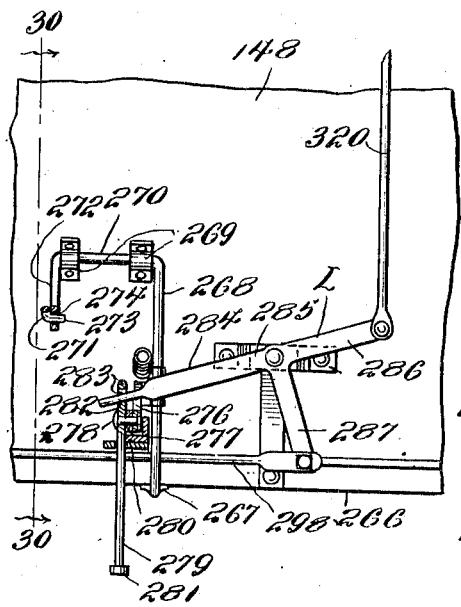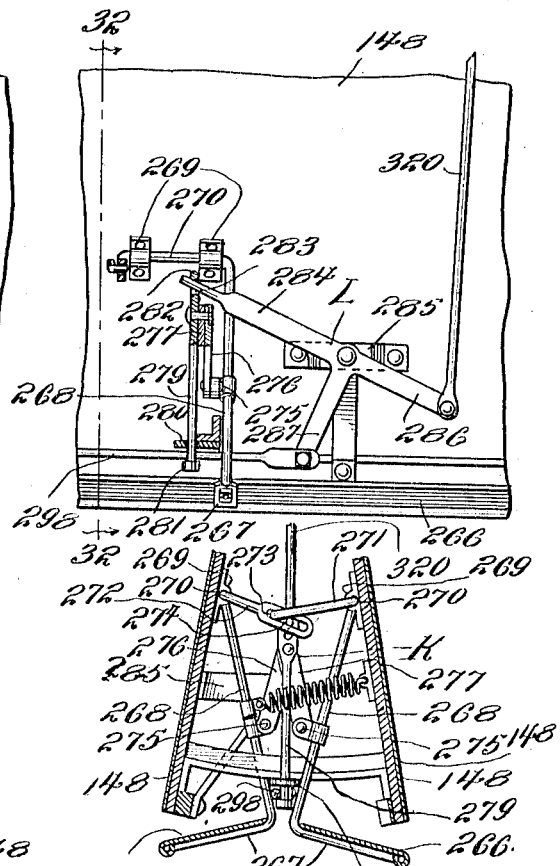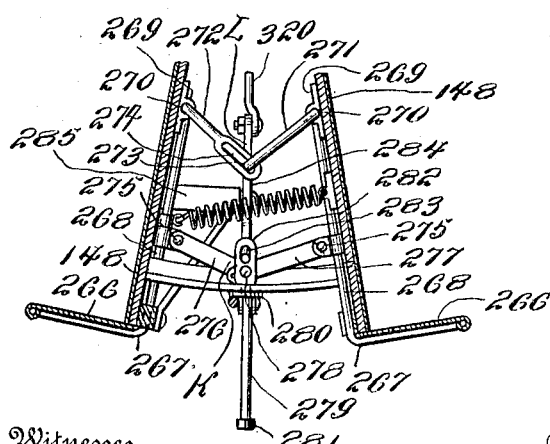

J. E. GRIFFITH.
GRAIN SHOCKING MACHINE.
APPLICATION FILED MAR. 22, 1912.
1,080,438.
Patented Dec. 2, 1913.
13 SHEETS—SHEET 11.
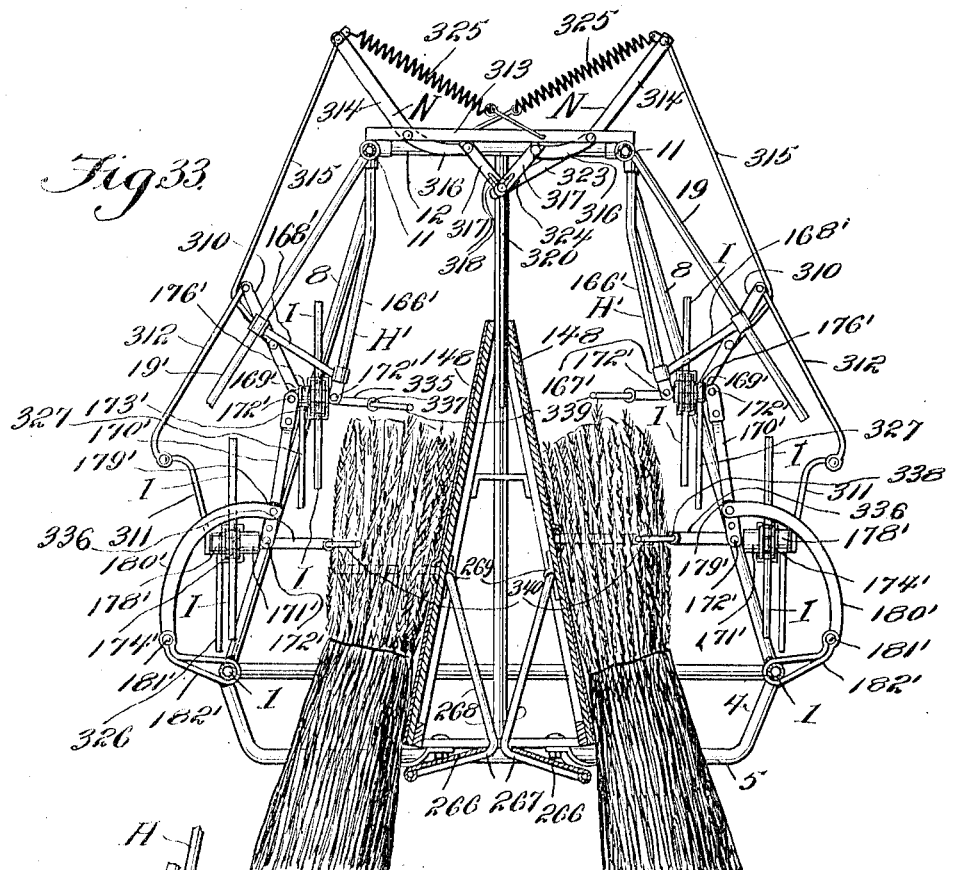
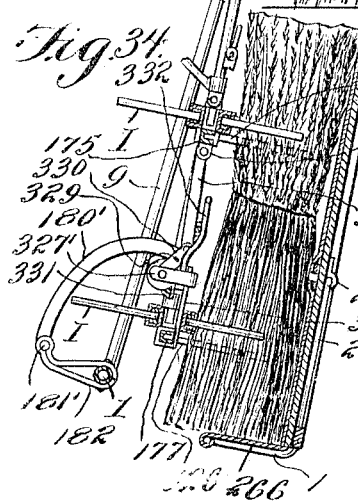
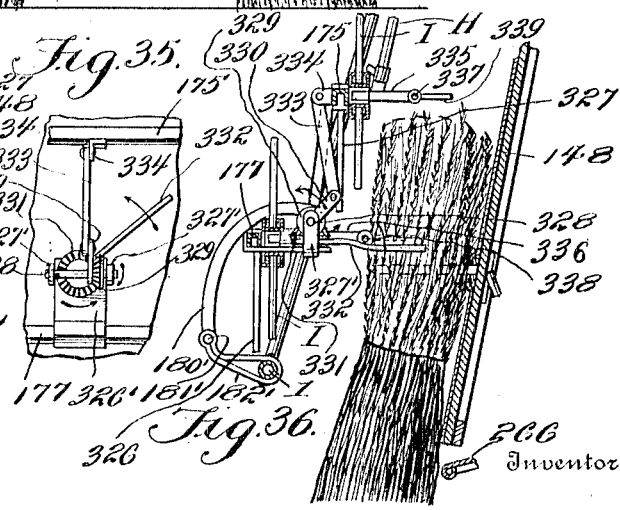
Witnesses
J. L. Wright
Wm Bagger
Inventor
Jesse E. Griffith,
By Victor J. Evans,
Attorney

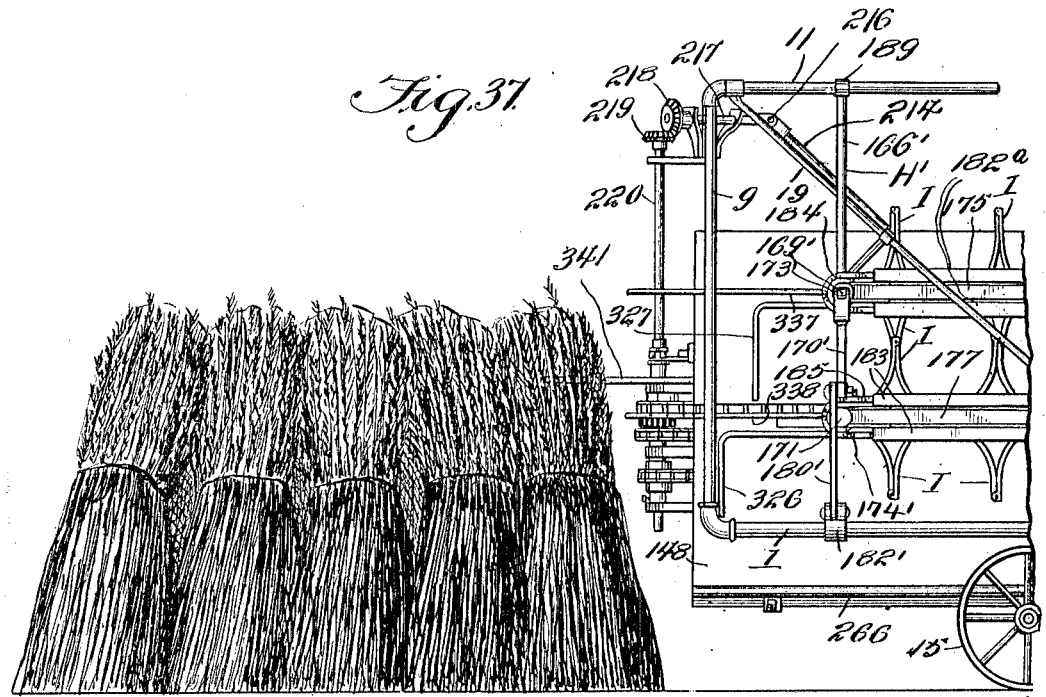
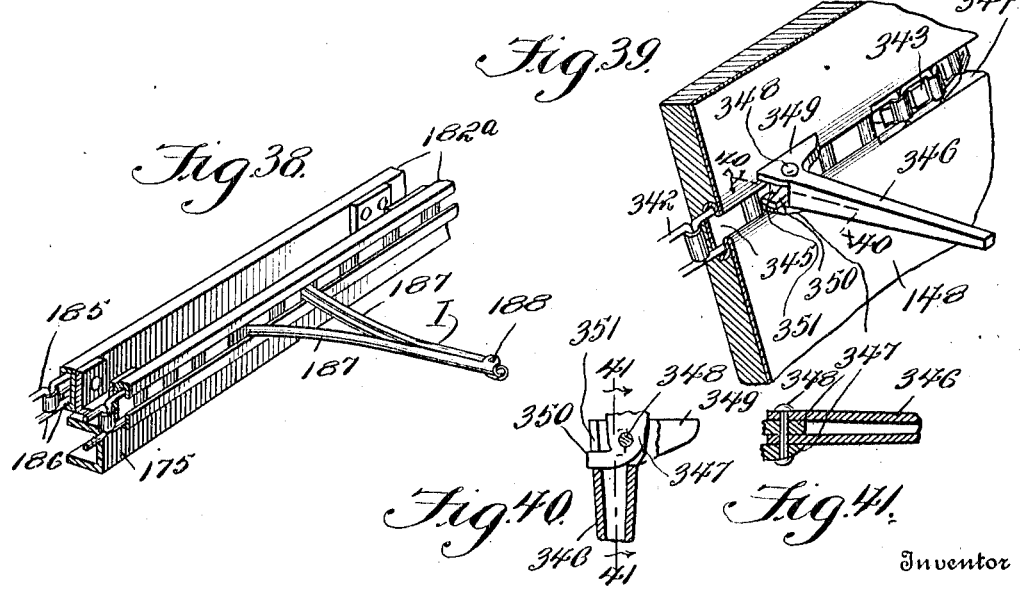

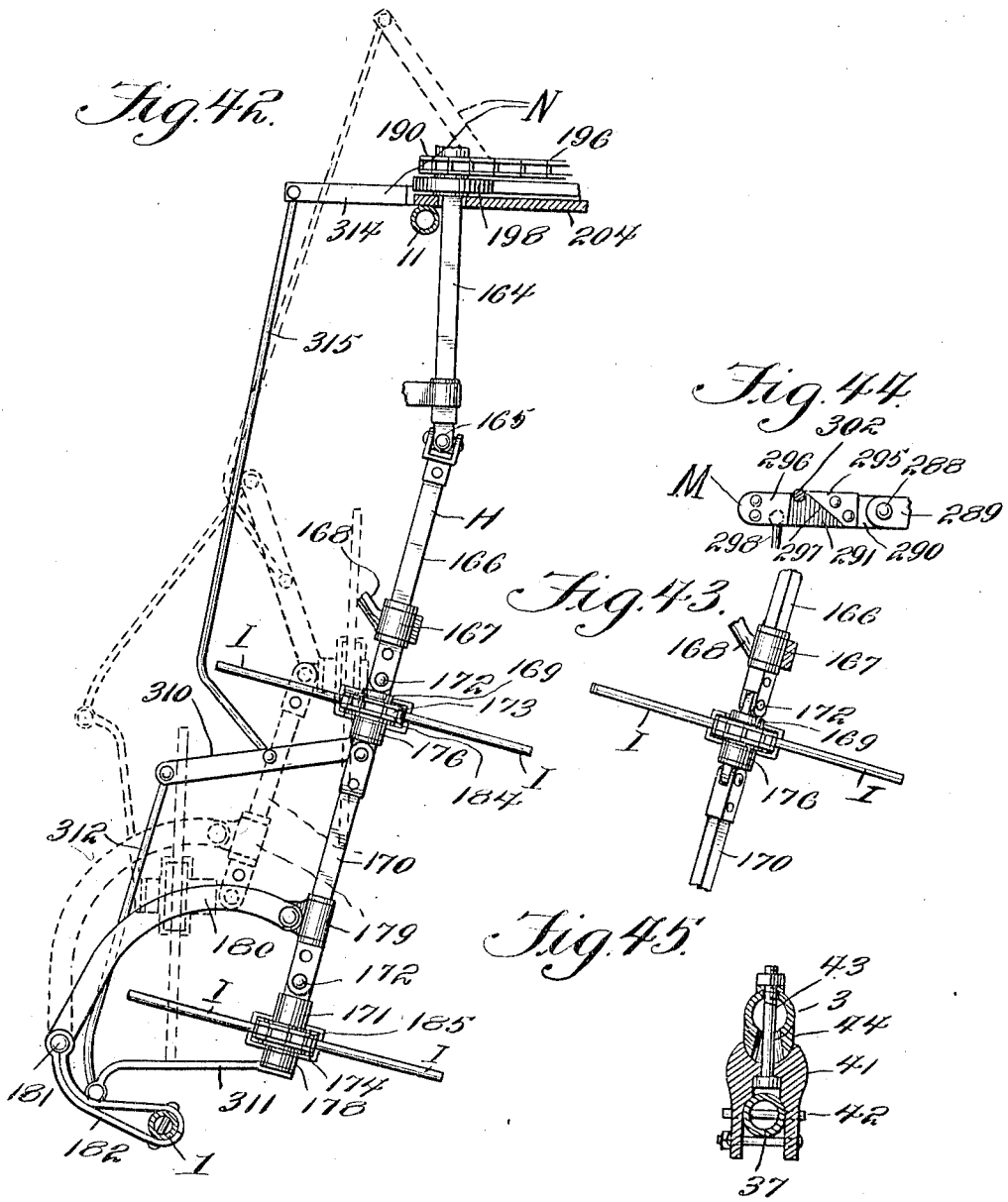

UNITED STATES PATENT OFFICE.

JESSE E. GRIFFITH, OF ALBION, NEBRASKA, ASSIGNOR, BY DIRECT AND MESNE ASSIGNMENTS, OF ONE-FOURTH TO JOB E. GREEN AND ONE-FOURTH TO D. V. BLATTER, BOTH OF ALBION, NEBRASKA.

GRAIN-SHOCKING MACHINE.

1,080,438.  Specification of Letters Patent.  Patented Dec. 2, 1913.

Application filed March 23, 1912. Serial No. 685,540.

*To all whom it may concern:*

Be it known that I, JESSE E. GRIFFITH, a citizen of the United States, residing at Albion, in the county of Boone and State of Nebraska, have invented new and useful Improvements in Grain-Shocking Machines, of which the following is a specification.

This invention relates to machines for shocking bundles of grain, such as wheat, oats, rye, barley and the like, and it has particular reference to a grain shocking device which is adapted to be attached to and operated in connection with a self-binding harvester of any approved modern type.

Another object of the present invention is to provide simple and improved means for transferring the sheaves from the point of delivery by the binding mechanism of the harvester to the mechanism of the shocker and for depositing the sheaves or bundles on the shock former.

A further object of the invention is to provide a simple and improved mechanism for inverting or upending the sheaves or bundles and for operating the upending mechanism.

A further object of the invention is to provide a simple and improved shock former on which the bundles are deposited and erected in two rows leaning against each other, together with mechanism for placing the bundles alternately on the two sides of the shock former.

A further object of the invention is to provide simple and improved means for advancing the bundles along the shock former to form a complete shock.

A further object of the invention is to provide simple and improved mechanism for obtaining an absolutely automatic tripping action when the shock former is filled with bundles.

A further object of the invention is to provide simple and improved mechanism for automatically dropping and mechanically assisting the bundles constituting the shock to the ground.

A further object of the invention is to provide simple and improved mechanism for returning to initial position the bundle supporting bottom members of the shock former which are withdrawn from beneath the bundles when the shock is dropped or deposited on the ground.

A further object of the invention is to provide simple and improved mechanism for returning the parts of the machine to initial operative position for repeated action.

A further object of the invention is to provide simple and improved means for supporting and compacting the shock as it is deposited on the ground and left behind by the machine.

A further object of the invention is to provide simple and improved mechanism for effecting vertical adjustment of one side of the shocker frame when operating on side hills.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings, Figure 1 is a side elevation of the improved shocking machine as seen from the stubble side. Fig. 2 is a top plan view of the same, showing also a portion of the binder frame with which it is connected. Fig. 3 is a rear elevation, showing also a portion of the binder. Fig. 4 is a transverse sectional view taken on the plane indicated by the line 4—4 in Fig. 2. Fig. 5 is a top plan view on a reduced scale of the frame structure of the shock former, showing also a portion of the binder and the means for connecting the shocker frame with the binder frame. Fig. 6 is a perspective detail view showing the ejector shaft and ejector arms of the binder, together with a small portion of the binder deck and mechanism connected with the ejector arms and with the binder deck for coöperation with the improved shocking machine. Fig. 7 is a detail view in sectional elevation, illustrating the means for effecting vertical adjustment of one side of the shocking machine. Fig. 8 is a detail view in sectional elevation of the bundle transferring and upending mechanism in the act of transferring a bundle from the binder to the shock former. Fig. 9 is a detail view in sectional elevation of the parts shown in Fig. 8, but showing said parts in position for delivering a bundle to the shock former. Fig. 10 is a sectional detail view of the transferring and inverting fork taken on the line 10—10 in Fig. 9. Fig. 11 is a sectional detail view of the fork taken on the line 11—11 in Fig. 8. Fig. 12 is a perspective detail view of the bundle transferring and inverting fork. Fig. 13 is a perspective detail view of the cam plate for guiding the fork and for actuating movable parts thereof. Fig. 14 is a top plan detail view of the mechanism for conveying alternate bundles to opposite sides of the shock former and adjacent parts. Fig. 15 is a detail top plan view showing the mechanism for transferring alternate bundles to opposite sides of the shock former in a different position. Fig. 16 is a sectional detail view taken on the line 16—16 in Fig. 14. Fig. 17 is a detail view in side elevation of the parts seen in Fig. 16. Fig. 18 is a detail side elevation showing the parts illustrated in Fig. 17, but in a different relative position. Fig. 19 is a sectional detail view taken on the line 19—19 in Fig. 17. Fig. 20 is a perspective detail view of the oscillating arm, whereby alternate bundles are transferred to opposite sides of the shock former. Fig. 21 is a sectional detail view taken on the line 21—21 in Fig. 1, to show the tripping mechanism. Fig. 22 is a detail side elevation of the parts shown in Fig. 21. Fig. 23 is a bottom plan view of the shock former and related parts, showing the bottom members in extended bundle supporting position. Fig. 24 is a bottom plan view of the shock former with parts, including the bundle supporting bottom members, removed to expose other parts of the device. Fig. 25 is a view similar to Fig. 24, showing the parts in the position occupied directly after the actuation of the trip mechanism. Fig. 26 is a view similar to Fig. 23, but showing the parts in a different position. Fig. 27 is a detail plan view of that part of the trip mechanism which is directly actuated by the bundles forming the shock upon completion of the latter. Fig. 28 is a sectional detail view taken on the line 28—28 in Fig. 26. Fig. 29 is a sectional detail view taken on the line 29—29 in Fig. 23. Fig. 30 is a sectional detail view taken on the line 30—30 in Fig. 29. Fig. 31 is a sectional detail view similar to Fig. 29, but showing the parts in a different relative position which is substantially the same as occupied by said parts in Fig. 26. Fig. 32 is a sectional detail view taken on the line 32—32 in Fig. 31. Fig. 33 is a transverse sectional view taken on the line 33—33 in Fig. 1, showing the device tripped and in the act of depositing a shock on the ground. Fig. 34 is a sectional detail view taken on the line 34—34 in Fig. 1, to show the means for tilting the front end bundle of the shock. Fig. 35 is a detail front view of some of the parts seen in Fig. 34. Fig. 36 is a view similar to Fig. 34, but showing the parts in shock depositing position. Fig. 37 is a side elevation of the rear portion of the shock forming machine showing also the shock which has been just deposited thereby and the means for engaging and compacting the rear end of the shock. Fig. 38 is a perspective detail view of one of the chains for moving the bundles along the shock former, showing also the guide and supporting means for such chain and one of the bundle engaging fingers. Fig. 39 is a perspective detail view, showing a portion of one side of the shock former with a portion of one of the shock discharging chains and one of the shock engaging fingers of such chain. Fig. 40 is a sectional detail view taken on the line 40—40 in Fig. 39. Fig. 41 is a sectional detail view taken on the line 41—41 in Fig. 40. Fig. 42 is a view in elevation of one of the shafts H supporting the front ends of the bundle distributing chains and related parts, with dotted lines indicating the position of the parts when the chains are tilted for the purpose of depositing a shock. Fig. 43 is a detail view of a portion of one of the shafts H as seen from a different angle. Fig. 44 is a detail plan view of the compound arm M, detached. Fig. 45 is a sectional detail view, enlarged, taken on the line 45—45 in Fig. 5.

Corresponding parts in the several figures are denoted by like characters of reference.

The frame structure of the improved grain shocker includes a bottom frame which, as best seen in Fig. 5, comprises two side members 1 which are provided intermediate their front and rear ends with forwardly converging arcuate offsets 2. The front ends of said side members, which owing to the offsets 2 are placed more closely together than the rear ends of said side members, are connected at their forward extremities by a cross bar 3, thereby forming the bottom frame structure outlined in Fig. 5. This bottom frame, as well as other parts of the frame structure, is to be constructed of light, rigid and durable material, such as bicycle tubing, and the different parts of the entire frame structure may be built and assembled in any suitable workmanlike manner, whereby the necessary qualifications, strength, rigidity and lightness will be best assured. The side members 1, 1 of the bottom frame are provided directly in rear of the offsets 2 with downwardly extending brackets 4 connected together by a cross bar 5 which is thus supported in a plane below that of the side members. Downwardly extending brackets 6 adjacent to the front ends of the offsets 2 are connected with the cross bar 5 by rearwardly converging braces 7 which, together with the cross bar 5, are utilized to support superposed parts.

Connected with and rising from the side members 1 of the bottom frame are front and rear uprights 8 and 9. The uprights 8 are connected with the side members 1 directly in rear of the offsets 2, and the uprights 9 are connected with the rear ends of said side members. The uprights 8 are provided near their upper ends with offsets 10. The uprights 8 and 9 connected with the two side members of the frame are tilted inwardly in the direction of the longitudinal center of the frame, and said uprights are connected with and serve to support a top frame which is composed of side members 11 and front and rear cross bars 12 and 13. This top frame is of a length approximately equal to the length of that portion of the side members 1 of the bottom frame which lies in rear of the offset 2, and the width of the top frame is approximately equal to one-half the distance between the rear portions of the side members 1 of the bottom frame, it being understood, however, that the proportions may be varied to any desired extent.

The side members 1 of the bottom frame are provided with V-shaped brackets 14 that extend laterally in an outward direction from said side members, said brackets serving to support the caster wheels 15 and 16 at the stubble side and the grain side, respectively. The caster wheel 15 at the stubble side of the machine has a shank 17 which is swiveled in a tubular socket or boxing 18 that is connected with and supported by the bracket 14 at that side of the machine, the upper extremity of the tubular socket or box member being connected by means of braces 19 with the proximate side member 11 of the top frame. The caster wheel 16 at the grain side of the machine has a swivel shank 20 associated with a socket or boxing 21 having an upward tubular extension 22 which is preferably square in cross section and which is provided at its upper end with a laterally extending bracket 23 upon which is fulcrumed a hand lever 24. Slidably mounted on the tubular extension 22 is a sleeve 25 which is connected with the triangular bracket 14 at that side of the machine see Fig. 7, said sleeve being also connected with the proximate side member 11 of the top frame by means of inclined braces 19' which correspond to the braces 19 at the opposite side of the structure. The hand lever 24 is connected with the sleeve 25 by means of a lifting rod 26, and the laterally extending bracket 23 is connected with the sleeve 25 by means of a coiled spring 27 which exerts an upward pull on the sleeve 25 and on the side of the shocker frame with which it is connected, thereby facilitating vertical adjustment of the side of the shocker frame with reference to the caster wheel 16 by means of the lever 24, the handle of which is positioned in such a manner as to be conveniently accessible to the driver or operator of the harvester and binder with which the shocking machine is associated for operation. For the purpose of enabling the parts to be retained in any position to which they may be adjusted, there is provided a bell crank 28 which is fulcrumed on the lever 24, one arm of said bell crank being connected by a rod 29 with a spring actuated lever handle 30 which, for the purpose of actuating the bell crank 28, may be depressed against the tension of its actuating spring 31. The other arm of the bell crank 28 is connected by a rod 32 with one arm of a bell crank 33 which is fulcrumed on the sleeve 25, the other arm of said bell crank 33 being provided with a tooth 34 adapted to engage any one of a plurality of notches or recesses 35 in the tubular extension member 22 through an aperture 36 in the sleeve 25. The bell crank 33 thus constitutes a latch member which, by pressure of the hand of the operator on the pivoted lever handle 30, may be actuated to release the sleeve 25 or to lock it in adjusted position upon and with reference to the tubular extension member 22 whereon it slides. It will be seen that by this simple mechanism, the grain side of the shocking machine is capable of being vertically adjusted, and that such adjustment may be effected without materially taxing the strength of the operator, owing to the presence of the spring 27 which may be made sufficiently powerful to practically balance the weight imposed thereon.

For the purpose of connecting the shocker frame with the frame of the harvester and binder in connection with which it is to be used, special connecting means is provided. These connecting means must be of such a nature as to permit the shocking machine to be easily and quickly connected with or detached from the frame of the harvester and binder. Said connecting means must also be of such a nature as to enable the shocking machine to be drawn along as a substantially rigid portion of the harvester frame having only such flexibility of itself at the connections as to allow the shocking machine frame to adapt itself to variations in the ground independent of the variations in the ground over which the harvester frame is passing. The shocker frame must be held rigid with the harvester frame with respect to side movement, but it must be adjustable with respect to rearward and forward movement in order to enable needed adjustments to be effected when the binder mechanism of the harvester is adjusted forward or rearward to operate on long or short straw, as the case may be.

The connecting means whereby the shocker frame is associated with the harvester frame is as follows: A bracket arm 37, best seen in Figs. 4 and 5, is hingedly connected at 38 with the harvester frame, a portion of which is shown at A, for swinging movement in an approximately horizontal plane, said arm having a reinforcing brace 39 which is likewise hingedly connected with the harvester frame at 40. These hinge connections enable the bracket 37 to swing forward and backward while being held rigid with respect to vertical movement. Supported on the bracket arm 37 near the outer end thereof is a clevis member or saddle 41 which straddles the bracket arm and is held against lateral displacement thereon by means of pins 42 that extend transversely through the bracket arm. The saddle 41 is connected by a swivel bolt 43 with the front cross bar 3 of the bottom frame of the shocker, the top of the saddle member being rounded to engage a correspondingly rounded contact member 44 on the underside of the cross bar 3 through which the swivel bolt 43 extends midway between the ends thereof. The side member 1 at the grain side of the bottom frame of the shocker is provided with a laterally extending plate or bracket 45 having a series of apertures 46. A coiled traction spring 47 is connected at one end with the bracket arm 37 and at the other end with the forward aperture 46 in the plate 45. A connecting rod 48 is connected at one end with an eye 49 on the binder deck E said rod being provided at its other end with a hook 50 adjustable in any one of the apertures 46, except the front one with which the spring 47 is connected. It will be seen that by shifting the binder deck in the usual manner for long or short straw, the shocker frame will be moved longitudinally with respect to the harvester frame, the adjustment being facilitated by the presence of the pull spring 47. It will also be seen that while the shocker frame is held rigid as regards lateral movement with reference to the harvester frame, said shocker frame is capable of tilting slightly upon the swivel bolt 43 which connects the saddle 41 with the cross bar 3 of the shocker frame, owing to the rounded or spherical contact faces of the saddle 41 and the contact member 44.

A connecting rod or link 51, clearly seen in Figs. 2, 3 and 5, connects the harvester frame with the sleeve 25 which as previously described is rigidly associated with the shocker frame. This link connection, which completes the connection of the shocker frame with the harvester frame, is of such a nature as to yield readily to such adjustments of the shocker frame as are necessary and desirable. It may be stated that the caster wheels 15 and 16 are preferably disposed in such position that the shocker frame will be balanced thereon nearly as possible, considering the shifting nature of the load imposed upon the shocker frame when the machine is in operation.

Mounted upon the relatively narrow forward portion of the bottom frame of the shocker, in advance of the offsets 2, is the bundle transferring and upending mechanism, the main support of which is an upright or standard 52, the lower end of which is rigidly connected with one of the side members of the bottom frame. This standard or upright supports a shaft 53, see Figs. 1, 8 and 9, said shaft being provided with a crank 54 having for its wrist a roller 55 which operates in the slot 56 of a frame or yoke 57. The shaft 53 is connected with the ejector shaft B of the binder, from which it receives motion by means including miter gears 58, 59, one of which, 58, is mounted on the ejector shaft near the rear end of the same, while the intermeshing miter gear 59 is supported for rotation by a suitable yoke or bracket member 60, as best seen in Figs. 2 and 4 of the drawings. The connecting means further includes an extensible shaft 61 of ordinary telescoping construction, the members of which are connected, respectively, with the shaft 53 and the miter gear 59 by universal joints 62, 63. The miter gear 58 carries an ejector arm 64 which takes the place of the ejector arm usually located at this point and which coöperates with the mating ejector arm 65 in expelling the bundles from the binder as they are being completed. The substitution of the miter gear 58 carrying the ejector arm 64 for an ejector arm ordinarily found in self binders is one of the few changes in the binder mechanism that is necessitated by the use of the invention. It will be noted, however, that such changes as are made are of such a nature that they may be readily applied to any conventional type of self binding harvester without changing the general structure or the operation thereof.

The slotted frame or yoke 57 is provided with laterally extending arms, one of which, 66, extends rearwardly in the direction of the shock former to be hereinafter described, while the other arm, 67, extends in a forward direction. The arm 66 is pivotally connected at its rear end with the upper end of a supporting member or link 68, the lower end of which is pivoted upon the bundle pan D which is supported on the forward portion of the bottom frame of the shocker. The link or supporting member 68 is reinforced by a brace 70, the lower end of which is pivoted at 71 on one of the side members 1 of the bottom frame. The forwardly extending arm 67 is pivotally connected with the upper extremity of a supporting member consisting of a link 72, the lower extremity of which, is pivoted at 73 and which is reinforced by a brace 72' connected therewith by a rivet 73', see Figs. 2, 8 and 9. The yoke or frame 57 is thus supported for reciprocatory movement which is imparted thereto by the crank 54 of the shaft 53 when the latter is in motion.

Pivotally connected with the link or supporting member 68 adjacent to the upper end of the latter by an axial member 75 is the handle or shank 74 of the bundle up-ending and transferring fork F, the detailed construction of which is shown in Fig. 12 of the drawings. The pivot member 75 whereby the handle 74 is connected with the link 68 is located relatively near that end of the handle which is uppermost when the fork is in the approximately vertical position indicated in Fig. 9. The upper extremity of the handle 74 is connected by a link or connecting rod 76 with the upper end of the standard 52.

The fork handle 74 which in practice oscillates about the axis of the pivot member 75 to the extent of approximately one-quarter of a revolution is moved from an approximately horizontal position, indicated in Fig. 1, to the approximately vertical position, indicated in Fig. 9, and back, by means of the revolving crank 54 and its wrist 55 engaging the slot 56 in the yoke 57, whereby the latter is reciprocated, the movement in a rearward direction of said yoke serving to swing the lower end of the fork handle in a downward and rearward direction, the upper end of said handle being restrained from movement in a rearward direction by the rod or link 76. The fork will thus be moved to the approximately vertical position shown in Fig. 9. By the return movement of the yoke, in a forward direction, the fork will be restored to the initial position shown in Fig. 1.

It is important in order that time may be given for the fork to receive and to discharge the bundle carried thereby that the movements from the initial position shown in Fig. 1 to the vertical position shown in Fig. 9, and back be performed intermittently and that a pause of sufficient duration shall occur at the end of each movement. In order that this result may be obtained, the front and rear walls of the slot 56 in the yoke or frame 57 which are directly engaged by the wrist pin 55 for the purpose of reciprocating the yoke are provided intermediate their upper and lower ends with arcuate recesses 77, 78 which are of a radius equal to the length of the crank 54. When, at the end of each movement in a forward or rearward direction of the yoke 57, either one of said recesses is traversed by the wrist pin 55, the yoke will obviously remain stationary, and a pause will occur in the movement of the parts actuated by said yoke until the latter is again positively engaged by the wrist pin to be thereby moved in a forward or rearward direction, as the case may be. It will be observed that while the wrist pin 55 of the crank 54 is traveling in engagement with those portions of the front and rear walls of the slot 56 in the yoke 57 which constitute the arcuate recesses 77 and 78, the yoke will have reached the limit of its movement in one direction and will be held against reverse movement by the action of the wrist pin, and it follows that the yoke and the parts actuated thereby will be maintained positively stationary while the arcuate recesses are being traversed. The swinging supporting members 68 and 72 will so support the yoke 57 that it will travel in what is practically a straight line between the forward and rear limits of its movement.

Referring now particularly to Fig. 12 of the drawings, it will be seen that the fork handle 74 is provided with a plurality of arms extending laterally in the direction of the binder with which the shocking machine is connected. In the drawings three such arms have been shown, this being the preferred number, and these arms will be designated, respectively, as the bottom arm 79, the top arm 80 and the intermediate arm 81, these being the relative positions occupied by said arms when the fork is in the approximately vertical position shown in Fig. 9. Pivotally mounted on each of the arms 79, 80 and 81 is a series of tines or prongs 82 which are connected together by a back or head member 83. These tines or prongs 82 are similar to the tines of an ordinary pitchfork, especially in their curved portion, and the series of tines connected with the respective arms are alike except in this, that the head member 83 pivoted on the bottom arm 79 has a series of four tines, while the head members 83 pivoted on the arms 80 and 81 are each provided with only two tines. For the purpose of normally maintaining the tines in a position approximately at right angles to the arms with which they are associated, springs are provided, each of said springs consisting of a coil 84 engaging the bolt or pivot member 85, whereby the tines are pivotally connected with the arms, each of said coils having oppositely extended ends 86 of equal length with terminal downturned portions 87 that lie adjacent to the front edges of the arms 79, 80 and 81 to bear equally against said arms and the head members 83 of the tines which are pivotally associated therewith. When pressure is brought to bear against either side of the tines, the springs will yield and allow the tines to be turned into another position; when such pressure is withdrawn, the tines will spring back to their normal or initial position. The springs constructed and arranged as herein described serve to normally maintain the tines in the proper position for piercing and lifting a bundle which, by swinging the tines against the tension of the springs by means to be hereinafter described, may be delivered from the fork in various directions.

Mounted for operation in combination with the series of tines pivoted on the upper and intermediate arms or brackets 80 and 81 are bundle grabbing tongs or holders, each comprising a pair of arcuate tines or members 88 of approximately circular shape which are pivotally or hingedly mounted on the arms or brackets 80, 81. These tines 88 of each pair are so arranged that they will open and close after the fashion of a pair of pincers. The said tines 88 are pivoted on the opposed faces of the arms 80 and 81, and each approximately circular tine 88 having its base hinged or pivoted inside the circle of the opposite or mating tine causes said tines to cross each other in rear of the arms or brackets 80 or 81 with which they are associated. The operation desired is that the tongs formed by these tines will close around or upon the upper part of a bundle which is being manipulated and upended by the fork so as to hold said bundle on the series of tines 82 until the bundle is upended and in position to be discharged from the fork. The desired result might be effected by the tines and tongs associated with the bottom arm 79 and the intermediate arm 81, alone, but for the purpose of facilitating the handling of bundles when the straw is unusually long the top arm 80 and the tines associated therewith are provided.

For the purpose of actuating the tongs or holding members composed of the tines 88, there is pivoted on each of the arms 80 and 81, in proximity to the handle member 74, a dog 89 having an eye 90 through which passes the two approximately circular tines 88. It will be seen that by actuating the dog 89, the tongs formed by the tines will be opened or closed, the backs of the tines sliding through the eye 90. A rod or connecting member 91 integrally connects one of the tines pivoted on the arm 80 with the corresponding tine pivoted on the arm 81, and being thus connected, it follows that only one of the dogs 89 requires to be actuated in order to operate both tongs or holding devices. For the sake of convenience only the dog 89 associated with the intermediate arm 81 will, therefore, be directly operated, and for this purpose the said dog is provided with an extension 92 projecting in the direction opposite to the eye 90 and constituting a lever whereby the dog may be actuated. In order to hold the tongs normally open in bundle receiving position, as shown in Fig. 12, a coiled pull spring 93 is attached to the extension 92 of the dog and to a projection 94 of the fork handle.

For the purpose of actuating the dog that governs the operation of the tongs or holding members composed of the tines 88 there is provided a cam plate C which is rigidly bolted to the standard or upright 52 and also to one end of a brace 95 which extends from said cam plate to a brace 96 that reinforces the standard 52. Said cam plate, the detailed construction of which is shown in Fig. 13, is of suitable curvature for the purpose in view. The extension or lever portion 92 of the dog 89 has pivotally mounted thereon a lever 98 which is adapted to break in one direction with reference to the extension 82, while movement in the opposite direction is limited by a lug 99 associated with said lever 98 and bent adjacent to one side of the extension member 92 which lies in the path thereof, said lug 99 being normally held in contact with the edge of the extension 92 by the action of a suitably arranged spring 100. When the fork moves from a bundle receiving position into a bundle discharging direction, the lever 98 will be engaged by the upper edge 97 of the cam plate, with the result of closing the tongs composed of the tines 88 upon the bundle, the said tongs being maintained in closed bundle engaging position by contact of the lever 98 with the proximate face of the cam plate while moving over the same. When the lower edge 101 of the cam plate is reached, the lever 98 will become disengaged, and the tongs will now be thrown open or placed in a bundle releasing (or receiving) position by the action of the spring 93 actuating the dog 89. In these relative positions the parts remain until the fork F starts on the return stroke, when the lever 98 will be actuated against the tension of the spring 100 by contact with the face of the cam plate C, thus preventing the interference of said lever with the return movement of the fork, and causing the tongs to remain open until a bundle has been received and the fork has been again started in a bundle discharging direction.

To prevent the fork F from springing away from the cam plate C as the lever 98 connected with the dog 92 is pressed against the side thereof, the upper edge of the said cam plate is provided with an arcuate guide 102 having a longitudinal slot 103 extending through the entire length thereof to receive and coöperate with a hook-shaped guide member 104 which is attached to the handle 74 of the fork and which travels in said slot; it being understood that the guide member 102 is of arcuate shape to correspond with the arc wherein the fork moves. As the lever 98 travels along one side of the cam plate, the hooked guide member 104 travels on the opposite side of said cam plate in the slot 103, thereby preventing any side movement of the fork member. This slot and guide also serves to assist in maintaining the fork member rigidly in position at the opposite limits of its movement for coöperation with other parts of the mechanism.

Coöperating with the fork F is a bundle receiving pan D which is mounted upon the forward end of the bottom frame of the shocker in the relatively narrow portion thereof, said bundle pan being partly supported on the cross bar 5 of said bottom frame, the rear portion of said bundle pan being widened to correspond with the offsets 2 of the bottom frame. The bottom 105 of the bundle pan is longitudinally curved, as will clearly appear in Figs. 8 and 9 to correspond in some degree with the arcuate path wherein the lower end of the fork F moves. The forward portion of the bundle pan which lies between the side members 1, 1 of the bottom frame is provided with outer and inner side walls 106, 107, best seen in Fig. 4, by reference to which it will appear that the inner side wall 107 has at its upper end a curved flange portion 108 that extends beneath the lower end of the binder deck E of the grain binder with which the shocking machine is associated. The portions 109 of the side walls that rise from that portion of the bottom 105 of the bundle pan which lies between the curved offset portions 2 of the side members of the bottom frame are curved at their lower ends to correspond with said offsets, and the upper ends of said side portions 109 are connected with and supported by arms 110 associated with the frame structure of the machine, said side portions 109 constituting shields whereby the bundle is guided to the shock former when discharged or delivered by the fork. It will be understood that the curved flange portion 108 of the inner side wall of the bundle pan is in no wise connected with the binder deck, but is simply extended therebeneath in order to receive bundles that are discharged from the binder and to guide such bundles in the proper direction.

Lying above and adjacent to the stationary bottom member 105 of the bundle pan is a movable bottom member or lifting member 111, the same being supported by a hinge rod or bolt 112 which extends transversely of the bundle pan and through the side walls thereof, as best seen in Fig. 4. The outer end of the rod or bolt 112 is bent to form a crank or handle 113 with which the lower end of a lifting rod 114 is adjustably connected by means of a pivot member, such as a pin or bolt 115 extending through the lifting rod and through one of a plurality of perforations 116 in the crank 113. The lifting rod 114 extends upwardly in the direction of the top of the standard 52, and it has at its upper end an arm 117 extending approximately at right angles to the main portion of the lifting rod. A brace or link 118, one end of which is pivoted on the lifting rod 114 at 119, see Fig. 9, has its other end pivotally connected at 120 with the standard 52, said link or brace 118 serving to connect the lifting rod with the standard so as to maintain it in proper position for operation. Mounted on the crank shaft 53 is a crank 121 having a wrist pin 122 which is adapted as the shaft 53 rotates to engage beneath the arm 117, thereby serving to lift the rod 114, and thereby tilting the lifting member 111 in an upward direction to the position indicated in Fig. 8. It will be understood that when the arm 117 of the lifting rod 114 is first engaged by the wrist pin, the lifting member 111 lies down flat on the bottom 105 of the bundle pan. As the crank shaft turns, the member 111 is gradually lifted to the inclined position shown in Fig. 8 which is at an angle of approximately forty-five degrees to its horizontal or inoperative position. When this position is attained the wrist pin 122 slips from beneath the arm 117, and the member 111 will drop by gravity to its inoperative position which is indicated in dotted lines in Fig. 9.

Arranged in the forward end of the bundle pan, where it is mounted and supported by means of a hinge bolt 123 in a manner similar to that of the member 111, is a second lifting member 124 which is slightly curved, as shown, to correspond with the contour of the forward portion of the bottom 105 of the bundle pan. The bolt or hinge member 123 is bent at its outer end to form a crank 125 with which the lower end of a push rod 126 is pivotally connected, as shown at 127. The upper end of the push rod is bent to form an arm 128 lying in the path of the wrist pin 122, and said push rod is connected with the standard 52 by means of a link 129, whereby it is steadied and maintained in proper position to be operated upon. When the wrist pin 122 reaches a certain point in its downward stroke it comes in contact with the arm 128, thus pushing down on the push rod 126 and on the crank 125, thereby lifting or elevating the forward end of the lifting member 124 from its initial position, shown in Fig. 9, to the upwardly tilted position shown in Fig. 8. When the wrist pin 122 becomes disengaged from the arm 128, the lifting member 124 will drop by gravity to the initial position shown in Fig. 9. A suitably arranged spring 130 may be used to assist in returning the lifting member 128 to its initial position, said spring having been shown as having one end attached to the crank 125 and the other end to the outer side wall of the bundle pan.

It is important and desirable that the bundle discharged from the grain binder be deposited fully and squarely against the outer side wall of the bundle pan, in order that it may be effectively engaged and operated upon by the fork F, and to assist in accomplishing this result, the following mechanism is provided, the same being particularly illustrated in Fig. 6 of the drawings. Fulcrumed upon the outer ends of the ejector arms 64 and 65 of the binder are bell cranks G, said bell cranks being mounted on the opposed or proximate faces of the ejector arms. The long arms 131 are disposed to normally lie adjacent to the ejector arms, being drawn in this direction by the action of the suitably arranged springs 132; the short arms 133 of the bell cranks are normally disposed approximately at right angles to the ejector arms from which they project rearwardly with reference to the movement of said arms when in operation. A portion of the binder deck, is shown at E, and above and adjacent thereto appears, at E', a portion of the usual shield under the knotter mechanism of the binder, which supports an obstructing member 134, the ends of which lie in the path of the arms 131 of the bell crank G. Thus, when the shaft B carrying the ejector arms rotates the said ejector arms carry the bell cranks G around until the arms 131 of said bell cranks come in contact with the ends of the obstructing member 134, thus causing the bell cranks to be advanced, as clearly indicated in dotted lines in Fig. 4 of the drawings, thereby positively engaging the bundle at a time when the ejector arms proper have passed out of engagement therewith, and positively and squarely pushing the bundle in the direction of the outer wall of the bundle pan. As soon as the arms 133 of the bell cranks pass out of engagement with the bundle, the said bell cranks are restored by the action of the retracting springs 132 to their initial position for a repetition of the operation. It will be readily seen that these bell cranks and the obstructing member 134 whereby they are actuated do not in any wise obstruct or interfere with the operation of the mechanism of the grain binder proper, but these parts, while mounted on the grain binder, must be regarded as parts of the improved shocking mechanism, being found essential to the complete and satisfactory operation thereof.

Connected to the extreme rear end of the ejector shaft B of the self binder is a universal joint 135 to which is attached one end of an extensible telescopic shaft 136, the other end of which is connected with a universal joint 137 attached to the forward end of a shaft 138 which is supported in suitable bearings on the forward and upper side of the shocker frame adjacent to the harvester. Upon the rear end of the shaft 138 is mounted a bevel gear 139 which meshes with a bevel gear 140. The bevel gear 140 is secured on the lower end of a vertical shaft 141 having at its upper end a crank 142 provided with a wrist pin 143 with which one end of a pitman 144 is connected. The other end of the pitman 144 is connected with a wrist pin 145 on a crank 146 which is secured at the upper end of the vertical shaft or post 147 which is mounted on the shocker frame in rear of the bundle pan and adjacent to the front ends of the side members 148 of the shock former, said side members being connected at their front ends by cross bars, one of which will be plainly seen at 149 in Fig. 20 of the drawings, and said cross bars constituting parts of some of the bearings for the shaft 147. The side members or side walls 148 of the shock former are supported on the bottom frame, longitudinally of the latter, and are tilted upwardly in the direction of one another to present an A-shaped contour. The shaft 147 is provided with a plurality of brackets 150, as seen clearly in Fig. 1 and also in Fig. 20, where one of said brackets and related parts is illustrated in detail. In Fig. 1, three such brackets have been shown, but the number may be varied at will. Each bracket has at its inner end a sleeve or hub 151 provided with a set screw 152, whereby it is securely mounted on the shaft, and the several brackets are disposed approximately in the same vertical plane.

The ejector shaft B of the binder, during the operation of binding and discharging a bundle, performs but a single rotation, stopping again at the same point from which it started. This is common with all self binding harvesters. The shaft B in making one revolution rotates the shaft 138 with the bevel gear 139 just once. The bevel gear 139 contains just one-half as many teeth as the bevel gear 140 meshing therewith, and consequently the gear 139 in making one complete revolution rotates the bevel gear 140 and the shaft 141 only to the extent of one-half of a revolution. The crank 142 which is rigidly connected with the shaft 141 is so arranged on said shaft as to always stop at dead center with respect to the shaft 147, thus starting at dead center at any one of its half rotations, but going always in the same direction. By making the crank 146 associated with the shaft 147 of a length slightly exceeding that of the crank 142 on the shaft 141, it is obvious that the rotary motion of the shaft 141 will be converted into an oscillatory motion of the shaft 147, the extent of the oscillatory movement of the shaft 147 being a trifle less than one-half of a rotation. Thus, during the time occupied by the self binder in the formation and ejection of a bundle, the shaft 147 will oscillate in one direction, and the brackets 150 associated with said shaft will sweep from one side of the shock former to the other, said brackets being so disposed as to point in the direction of the front end of one side of the shock former at the completion of the movement of the shaft in one direction. The brackets 150 mounted on the shaft 147 carry arms 153, the purpose of which is to engage the bundles that are presented by the fork F and to move said bundles to one side or the other of the shock former. The bundle engaging ends of these arms should have a movement in excess of the less than one-half rotation of the shaft 147, and with this end in view the following construction is provided: Each of the arms 153 is mounted on the end of a bracket 150 by means of a pivot member, such as a bolt 154. In order that the arm 153 may be held normally in a straight position in alinement with the bracket 150, there is provided a coiled spring 155 which is mounted on the bolt 154, said spring having projecting ends or arms 156 and 157 with downturned ends 158 and 159, the downturned end 158 of the arm 156 being extended through an aperture 160 in the forwardly extending end of the arm 153, while the downturned end 159 of the arm 157 is similarly extended through an aperture 161 in the bracket 150. The bracket 150 and the arm 153 will thereby be normally held in a straight line with reference to each other, but capable of being broken in either direction. The inner end of the arm 153 extends in the direction of the shaft 147, which latter, however does not obstruct the swinging movement of the arm. The inner end of the arm 153 is offset downwardly, as indicated at 162 in Fig. 20, to permit said inner end to engage a lug or obstruction 163 which is mounted on the cross bar 149 or otherwise suitably supported in the path thereof, the purpose of this being to cause the outer end of the arm 153, when the shaft 147 swings in either direction, to break with reference to the supporting bracket 150 and to advance at greater speed than said bracket, see Fig. 20. In order that the arm 153 may remain in this position at an angle with reference to the supporting bracket 150, the lug or obstructing member 163 may be made of any desired extent, causing the inner end of the arm 153 to slide over the same. The parts, however, are so proportioned that when the stroke or movement in one direction of the shaft 147 has been completed, the inner end of the arm 153 will become disengaged from the lug or obstruction 163 when, under the impulse of the spring 155, it will be restored to a position in approximate alinement with the bracket 150. When the shaft 147 returns in the opposite direction, the operation is repeated with the only difference that the arm 153 is pivoted or advanced in an opposite direction.

As a means of conveying and distributing the bundles carried to the respective sides of the shock former by the brackets and arms associated with the oscillatory shaft 147, and to maintain the bundles in an upright position, and that the means so used may also be employed as a means to assist the bundles so distributed along the sides 148 of the shock former in dropping to the ground when it is desired to form said bundles into a shock, and in order that said bundles may be guided in their descent to the ground and that the means used may be capable of properly and timely disengaging itself from the bundles so assisted and guided, the following mechanism is employed: Supported for rotation on the top or upper portion of the shocker frame adjacent to the front corners thereof are vertical shafts 164, each having at its lower end a universal joint 165 from which is suspended a shaft H. These shafts H, one at each side of the shock former and adjacent to the front end thereof, constitute the drive shafts for the endless chains by which the sheaves or bundles are distributed or carried along the sides of the shock former. Each of the shafts H is made up of a plurality of sections, namely, a top section 166, the upper end of which is connected with the lower end by the universal joint 165, and the lower end of which has a stationary bearing in a box or sleeve 167 supported by an arm 168 connected with one of the braces 19'. The shaft H further includes an upper sprocket carrying section 169, an intermediate section 170, and a lower sprocket carrying section 171, said sections being flexibly connected at their abutting ends, and the section 169 being likewise flexibly connected with the shaft section 166 by means of hinge joints of suitable construction, as indicated at 172, it being understood that these joints may be of any suitable construction which will enable the shaft sections to flex or bend with reference to one another when the shaft is in a certain predetermined position.

Suspended from the side members 11 of the top frame of the shocker, near the rear ends of said side members, are shafts H' which are constructed to correspond with the construction of the shafts H at the front corner of the shocker frame, each of said shafts H' being made up of a top section 166' having an additional support in a sleeve 167' which is connected by a brace 168' with one of the braces 19 or 19' as the case may be; the shaft H' further includes an upper sprocket carrying section 169', an intermediate section 170' and a lower sprocket carrying section 171', the several sections being flexibly connected together, and the upper sprocket carrying section 169' being likewise flexibly connected with the shaft section 166' by hinge joints 172' of suitable construction.

The sections 169 and 171 of the shaft H carry the upper and lower sprockets 173, 174 which are fixed on the respective shaft sections. The corresponding shaft sections 169' and 171' of the shaft H' carry sprockets 173' and 174' which are mounted idly for rotation on the respective shaft sections, it being understood that the shaft H' does not revolve, but is simply provided for the purpose of supporting the idle sprockets carrying the rear ends of the conveyer chains whereby the bundles or sheaves are conveyed from the front end of the shock former in a rearward direction thereon, the front ends of said chains being supported by the sprockets 173, 174 that are fixed on sections of the revolving shaft H. The sprockets 173 and 173' are connected together by a bar 175 provided at the ends thereof with sleeves or collars 176, 176' wherein the hubs of the sprockets 173, 173' are journaled. A similar bar 177 is provided at the ends thereof with sleeves or collars 178, 178' wherein the hubs of the sprockets 174, 174' are journaled. The lower ends of the intermediate shaft sections 170 of the front shafts H have bearings in boxes 179 which are hingedly connected with the upper or outer ends of arms or braces 180, the lower ends of which are hingedly connected at 181 with brackets 182 associated with the side members 1 of the lower shocker frame. The lower ends of the intermediate sections 170' of the shafts H' are, likewise, mounted in boxes 179', each of which is hingedly connected with the outer end of an arm 180', the lower end of which is hingedly connected at 181' with an arm or bracket 182' connected with one of the side members 1 of the lower shocker frame.

The bars 175 and 177 that connect the drive sprockets on the shaft H with the idler sprockets on the shaft H' are provided with slotted guide members 182ª and 183 wherein the upper and lower conveyer chains 184 and 185 are guided, said chains being also guided over the respective sprocket wheels on the shafts H, H'. The conveyer chains are made up of links 186 of suitable construction, and with said links, at suitable intervals, are connected the conveyer fingers I. These fingers, see Fig. 38, are each composed of two strips 187 of stamped sheet metal of U-shaped cross section, hingedly or pivotally connected together adjacent to their outer ends by means of a pin 188, their inner ends being suitably attached to or connected with the links of the respective conveyer chains.

It is obvious that by the construction just described, the inner ends of the members 187 of each finger may be spaced a greater or lesser distance apart to include one or more chain links therebetween, and it is desired to point out particularly that the bases or inner ends of the members of the fingers associated with the upper conveyer chain 184 are placed more closely together than those associated with the lower conveyer chain 185, thereby providing broader bases for the fingers associated with the lower conveyer chain and consequently lessening the distance between the bases of proximate fingers on said chain.

The sleeves or collars 176', 178' which afford bearings for the hubs of the idler sprockets 173', 174' are adjustably connected with the bars 175, 177 in order to enable the conveyer chains 184, 185 to be properly tensioned. In order that the necessary adjustment may be effected to accomplish this result, it may be mentioned that the upper end of each shaft section 166' is connected with a side member 11 by means of a sleeve or collar 189 slidable on such side member, while the brackets 182' supporting the arms 180' carrying the sleeves 179' that support the ends of the intermediate shaft sections 170' are likewise slidably mounted on the frame bars 1.

For the purpose of driving the conveyer chains 184, 185 at the two sides of the machine in such a manner that they will cooperate with and be properly timed with relation to the operation of the bundle carrying arms of the shaft 147, the following mechanism is provided, as best illustrated in Figs. 14 to 18, inclusive: Each of the shafts 164 carries near its upper end a sprocket wheel 190 which is loosely mounted thereon, the upper end of the hub of such sprocket wheel being equipped with a clutch member 191 intermeshing with a companion clutch member 192 which is slidably supported on a non-circular portion 193 at the upper end of the shaft 164, said non-circular portion carrying also a coiled spring 194 which is retained by a stop member, such as a pin 195, and which serves to force the clutch member 192 normally in the direction of and into engagement with the clutch member 191. The sprocket wheels 190 on the two shafts 164 are connected together by a chain 196, the forward lead of which is guided in engagement with a sprocket 197 on the upper end of the shaft 147, the parts being so proportioned that by each movement in one direction of the oscillating shaft 147, the sprocket wheels 190 on the shafts 164 will each make one complete revolution. The fingers I on the conveyer chains driven by the shafts 164 and related parts are also spaced apart on said chains in such a manner that by each complete revolution of one of the shafts 164, the conveyer chains will be moved a distance equal to the space between two proximate fingers; thus assuming two fingers of the conveyer chains to start from a position adjacent to the front end of the shock former which may be designated as a bundle receiving position, one movement of the chains will suffice to move such fingers in a rearward direction a sufficient distance to cause the next succeeding fingers to be placed in bundle receiving position where they will remain until that side of the machine is next actuated.

To lock the shafts 164 against rotation by reason of the bundles pressing against the fingers on the chains, or reversely with reference to the direction in which they are actuated by the clutch members, the following locking means are provided: Secured to the shafts 164 below the sprockets 190 are collars 198, each having at its outer rim a notch 199, said notches being engaged by dogs 200, 201 at the two sides of the frame. The dogs 200, 201 are fulcrumed at 202, 203 on the cap plate 204 of the shock former, and said dogs, being made of suitable shape and of sufficient length, have their actuating ends 205, 206 extended so as to lie in the approximately elliptic path shown in Fig. 15 by dotted lines of the pin 207 which extends in a downward direction through the pitman 144 which connects the crank 142 of the shaft 141 with the crank 146 of the shaft 147. Suitable springs 208 and 209 are provided whereby the dogs 200 and 201, respectively, are actuated to engage the notches 199 in the collars 198. In Figs. 14 and 15 the oscillatory shaft 147 has been shown at the two opposite limits of its movement, and by reference to said figures it will be seen that the crank 142 of the shaft 141 starts and stops not exactly on a dead center, but closely at the dead center of said crank with reference to the pitman 144 and the crank 146 of the shaft 147 which is actuated by said pitman. At the limits of the movement of the shaft 147, both of the shafts 164 are locked by engagement of the dogs 200, 201 with the collars 198. Assuming now that the crank 142 starts from the position indicated in Fig. 14, it will be seen that the said crank, the direction of rotation being indicated by an arrow, will move for a short distance without appreciably affecting the position of the shaft 147, but the pin 207 will engage the dog 200 and operate to disengage said dog from the notch 199 of the collar 198 of that shaft 164 in the direction of which the bundle engaging arms of the shaft 147 will be moved, said shaft being thus released so that it may be rotated by means of the chain 196 to the extent of one rotation in the proper direction. As the pin 207 passes out of engagement with the dog 200, the engaging end of the latter is moved by the action of the spring 208 in the direction of the collar 198, so that when the rotation of the shaft is completed, it will be automatically checked or stopped by the action of the dog. The position shown in Fig. 15 having now been attained, and the rotation of the shaft 141 being continued, the pin 207 will now engage the dog 201, moving said dog against the tension of the spring 209 to release the shaft 164 at that side of the machine, thereby enabling said shaft to be rotated by the chain 196 to the extent of one revolution, at the completion of which the spring actuated dog 201 engages the notch 199 in the collar 198, thereby checking the further rotation of said shaft and leaving both shafts 164 locked against turning, but ready for operation, as before.

For the purpose of automatically tripping and dumping the shock forming device by power derived from the harvester train, a driven shaft 210 of said harvester train is provided with a universal joint 211 which is connected by an extensible or telescopic shaft 212 wth a universal joint 213 at the lower end of the shaft 214. The lower end of said shaft 214 is journaled on a bracket 215 associated with the sleeve or housing 25 on the grainward side of the machine, and the upper end of said shaft is connected by a universal joint 216 with one end of a shaft 217 which is journaled across the upper rear grainward side of the shocker frame, said shaft carrying a bevel gear 218 meshing with a bevel gear 219 at the upper end of a vertical shaft 220 which is supported for rotation on the rear end of the shocker frame.

The shaft 220 carries at its lower end a disk 221, best seen in Figs. 21 and 22 of the drawings, said disk being provided on its underside with rollers 222 which are disposed equidistantly from the axis on the shaft on diametrically opposite sides of the latter. Supported in bearings 223 and 224, (see Fig. 3) beneath the shaft 220, in axial alinement therewith, is a shaft 225 carrying at its upper end a disk 226 upon which, at 227, is pivoted a dog 228 having an engaging face 229 adapted to contact with a trip bolt 230 which is supported for longitudinally sliding movement in bearings 231, 232 on the sides of the shock former. The trip bolt 230 is actuated by means to be hereinafter described for the purpose of placing it in an obstructing or non-obstructing position with reference to the dog 228. The dog 228 is actuated by a spring 233, the tension of which is exerted to normally move the engaging face 229 of the dog to the position shown in dotted lines in Fig. 21; that is, when the trip bolt is withdrawn from engagement with the face of the dog. Said dog also has an upwardly extending lug 234 which, when the dog is in the position indicated in dotted lines in Fig. 21, will lie in the path of the rollers 222 carried by the disk 221 on the shaft 220, which latter, it will be understood, is constantly rotated when the machine is in operation by its connection with the harvester train, as previously described. It will be understood that when the trip bolt is projected in a rearward direction, see Fig. 24, and is engaged by the face of the dog 228, the lug 234 of said dog will be held out of the path of the rollers 222. Retraction of the trip bolt from engagement with the face of the dog 228 will cause the latter to be moved by the action of the spring 233 to the position shown in dotted lines in Fig. 21, placing the lug 228 in the path of the rollers, and thus causing the shaft 225 to be rotated along with the shaft 220. When the trip bolt 230 is again projected in a rearward direction, it will be engaged by the face 229 of the dog, and the latter will, being thus obstructed, be moved to the position shown in full lines in Fig. 21, thereby moving the lug 234 out of the path of the rollers 222, and consequently interrupting the rotation of the shaft 225.

As will be seen very clearly in Fig. 3 of the drawings, the shafts 220 and 225 are located at one side of a central vertical line drawn between the sides of the shock former, and equidistantly from such central vertical line, at the opposite side thereof, is supported a shaft 235, said shaft being supported partly in the bearing bracket 224 and partly in a similar bracket 236. The shafts 225 and 235 are provided with intermeshing pinions 237, 238. The shaft 225 is equipped with a sprocket wheel 239 located above the pinion 237, and the shaft 235 has a corresponding sprocket wheel 240 which is disposed below the pinion 238. Mounted on the shaft 235 intermediate the bearings 224 and 236 is the main drive sprocket 241 which is utilized for driving the mechanism to be hereinafter described.

Secured on the inner faces of the side members 148 of the shock former, near the front ends of said side members, as will best appear in Figs. 23 to 26, inclusive, are supporting plates or brackets 242 having longitudinal slots 243 and serving to support a cross bar 244 having connecting members in the form of lugs 245 slidably engaging the slots 243 of the supporting brackets in such a manner as to enable the two ends of the cross bar 244 to move independently of one another longitudinally of the shock former. Fulcrumed on top of the cross bar 244 at a point 246 about midway between the ends thereof is a cruciform or double bell crank lever J having laterally extending arms 247, a forwardly extending arm 248 and a rearwardly extending arm 249, which latter is mounted in the fulcrum 246 intermediate its ends.

The side members 148 of the shock former are provided on their inner faces about midway between their upper and lower ends with bearings 250 wherein rock shafts 251 are supported for oscillation. Said rock shafts are provided at their lower ends with arms or cranks 252 which are adapted to be projected through slots 253 in the sides of the shock former so as to lie in the path of sheaves or bundles that are being deposited or moved in a rearward direction along the sides of the shock former. Each rock shaft 251 is provided at its upper end with an arm or crank 254, and said arms or cranks are connected by rods 255 with the ends of the slidably supported cross bar 244 carrying the cruciform or double bell crank lever J. The forwardly extending arm 248 of said lever is provided with a pin 256 which is adapted, when the lever occupies a certain forwardly projected position, to lie in the path of the arms 257, two in number, which project radially from a hub or collar 258 on the rock shaft 147 at the front end of the shocker frame.

The trip bolt 230 is actuated or projected in a rearward direction by the action of a spring 259 so that the projecting rear end of said trip bolt will normally lie in the path of the engaging face of the dog 228 hereinbefore described. The forward end of the trip bolt has a flattened head 260 which is provided with two parallel longitudinal slots 261, each of which is connected by a rod 262 with one of the laterally extending arms 247 of the lever J; the rear ends of the connecting rods 262 have upturned heads 263 that slidably engage the slots 261 in the head of the trip bolt, it being understood that when the latter is projected in a rearward direction and previous to the beginning of the tripping operation, the heads 263 will be positioned adjacent to the rear ends of the slots 261. At such time it will also be understood that the movably supported cross bar 244 is positioned adjacent to the rear ends of the slots 243 in the supporting plates or brackets 242. The movable cross bar 244, together with the lever J, is normally impelled in a rearward direction by the action of a spring 264 which connects the rearwardly extending arm 249 of the lever J with a stationary cross bar 265 connecting the sides of the shock former.

The trip mechanism which has just been described is intended and adapted to be actuated by the sheaves or bundles that are placed and moved in a rearward direction upon the sides of the shock former, it being understood that the trip mechanism will be actuated when, and only when, a predetermined number of bundles have been placed on the shock former. Usually ten bundles will form a shock, but the number may, of course, be varied with the only reservation that an equal number is placed on each side of the shock former. In Figs. 23 shelves or bottom members 266 extend the full length of the side members of the shock former adjacent to the lower edges of the latter and are adapted to swing in an inward direction between the side members of the shock former to the position indicated in Fig. 33 in which position the outer edges of the bottom members 266 will be positioned inside of the lower edges of the side members 148 of the shock former, thus permitting the sheaves to move downwardly by gravity assisted by means to be hereafter set forth. The bottom members 266, when projected beyond the lower edges of the side members 148, will be positioned substantially at right angles to said side members, as clearly seen in Fig. 3. It will be observed that when the bottom members are swung inward to the position shown in Fig. 33, they do not frictionally engage the butt ends of the sheaves but are practically dropped from under the butt ends of the sheaves, thus enabling the dropping operation to be performed with very trifling expenditure of power. To cause the bottom members 266 to swing in and out with perfect stability and uniformity the center bracket or hanger 267 at each side of the shock former is provided at the upper end of its upwardly extending arm 268 with a hinge bolt 270 of relatively great length, as will be seen in Fig. 23, said hinge bolt being securely supported for oscillation. To equalize the movements of the bottom members and to prevent one from moving faster than the other, thus leaving one of their edges exposed, and also to prevent the bottom members from swinging from side to side after they have been withdrawn from beneath the bundles constituting the shock, the middle hinge bolts 270 at the two sides of the shock former are bent to form inwardly extending arms 271, 272, the arm 271 being provided with a terminal finger 273 that operates in a slot 274 in the arm 272, see Figs. 23, 30 and 32. These parts operate conjointly with means provided for the purpose of locking or maintaining the bottom members securely in projected position, as will be now described.

Hingedly connected with the arms 268 of the middle hangers of the bottom members, as clearly seen at 275 in Figs. 30 and 32, the outer ends of the members 276, 277 of a jointed brace K, the inner ends of said members being pivotally connected together at 278 in such a manner as to permit the brace to break either in an upward or downward direction. Connected with the pivot member 278 of the brace K is a guide rod 279 which operates through an aperture in a cross bar 280, which latter serves to obstruct and to limit the movement of the brace K when it breaks in a downward direction. The guide rod 279 has at its lower end a stop member 281 which, by engaging the cross bar 280, serves to limit the movement of the brace K when it breaks in an upward direction. The upper end of the guide rod 279 has a head 282 provided with a slot or aperture 283 for the passage of the end of one arm 284 of a T-shaped lever L which is fulcrumed on a bracket 285 upon the inner face of one of the side members 148 of the shock former. The lever L, in addition to the arm 284, which extends in a rearward direction from the fulcrum of said lever, has a forwardly extending arm 287.

Hingedly supported at 288, see Figs. 23, 26 and 28, on a bracket 289 on one of the side members of the shock former is a compound arm M which is composed of a body plate 290 having a downwardly offset portion 291 forming a recess 292, said offset portion being connected by a reinforcing brace 293 with the lower portion of the bracket 289 with which it is connected by a pivot or hinge member 294 in axial alinement with the pivot or hinge member 288. Riveted or otherwise secured on the upper face of the body plate 290 are two plates, namely, an inner plate 295 and an outer plate 296, the inner plate being so designated because it is positioned adjacent to the hingedly supported end of the body plate, while the outer plate 296 is positioned adjacent to the outer or free end of said body plate. The outer end of the inner plate 295 is cut off obliquely, as will be seen at 297 in dotted lines in Figs. 23 and 26, and which is shown in detail in Fig. 44, and these portions of the plates 295 and 296 which overhang the recess 292 are separated by a space or opening which, owing to the oblique formation of the overhanging portion of the plate 295, assumes an approximate V-shape. The free end of the swinging compound arm M is connected by a link or rod 298 with the downwardly extending arm 287 of the T-shaped lever L which latter, when the arm M is swung, will be rocked, thereby operating the brace K to swing the hangers carrying the bottom members 266 for the purpose of moving said bottom members outward or inward with relation to the lower edges of the side members 148 of the shock former. The bottom members will be locked in projected or retracted position, as the case may be, by the hinged brace K which latter, as described, will break either in a downward or upward direction, see Figs. 30 and 32, and the movement of which is limited in one direction by the cross bar 280 and in the other direction by the stop member 281 engaging said cross bar.

To actuate the swinging arm M a chain 299 is provided, said chain being guided at one end over the sprocket wheel 241 and at the other end over an idle sprocket 300 which is journaled on a cross bar 301 in and 26 trip mechanism has been shown which is adapted to be actuated when a shock of ten bundles has been accumulated. These bundles, as will be understood from the foregoing description, are placed alternately on opposite sides of the shock former and are fed or moved intermittently in a rearward direction until the requisite number has been accumulated. When the fifth bundle is placed in position on one side of the shock former, and the five bundles are moved rearwardly to discharging position, the first bundle of the series (being the bundle at the rearward end of the shock former) will encounter the arm 252 of the rock shaft 251 which projects through the slot 253 at that side of the machine, said arm being positioned initially and normally in a position approximately at right angles to the face of the side of the shock former through which it projects, and said arm will be moved down in the direction of the face of the shock former, thus oscillating the rock shaft 251 and causing the arm 254 to swing in a forward direction, pushing against the rod 255 and moving one end of the movable cross bar 244 in a forward direction against the tension of the spring 264. As the end of the cross bar 244 approaches the forward end of the slot 243 in the supporting bracket 242, the arm or crank 254 of the rock shaft will pass the center line with respect to the end thrust of the rod 255, and the tension of the spring 264 being still exerted on the cross bar 244, the end of the latter will be moved slightly in a rearward direction until the extreme end of the crank arm 254 abuts upon the inner face of the side of the shock former on which it is mounted, thereby checking its movement and at the same time locking it and the end of the cross bar 244 against return movement. The position which has now been attained is illustrated in Fig. 24 of the drawings. The fifth and last bundle being now deposited on the other side of the shock former, and the five bundles on that side being moved rearwardly, the rearward bundle of that series will now engage the projecting arm 252 of the rock shaft on that side of the shock former with the result of oscillating said rock shaft and causing the arm 254 to push the rod 255 in a forward direction, moving the end of the cross bar 254 with which it is connected likewise in a forward direction until by the action of the spring 264, the arm 254 is swung past dead center, and the parts are locked in this position, as indicated in Figs. 25, 26.

It is obvious that the cruciform or double bell crank lever J is projected forwardly, together with the cross bar 244 on which it is fulcrumed but, as will be seen by reference to Fig. 24, when only one end of the cross bar 244 is projected and locked in a forward position, the pin 256 connected with the forwardly extending arm 248 of the lever is still positioned beyond the path of the arms 257 of the collar 258 on the rock shaft 147. When, however, the second end of the cross bar 244 is projected forwardly, the pin 256 will be positioned in the path of said arms and, no matter in which direction the next oscillation of the shaft 147 happens to be, one of the arms 257 will engage the pin 256 and will rock or tilt the lever J on its fulcrum. In the meantime, it will be understood that when the two ends of the movable cross bar 244 are projected, one after the other, in a forward direction, the heads 263 of the rods 262 will be moved forwardly in the slots 261 in the head of the trip bolt 230, the parts being so proportioned that when the forward position of the cross bar 244 has been attained, the heads 263 of the rods 262 will be positioned closely adjacent to the front ends of the slots 261. Now, when the lever J is rocked or tilted in either direction by the action of one of the arms 257, it follows that one or the other of the rods 262 will exert stress in a forward direction on the trip bolt, against the tension of the spring 259, thus disengaging the trip bolt from the dog 228 and causing the latter to be moved by the spring 233 until the lug or projection 234 lies in the path of and is engaged by one of the rollers 222 associated with the disk 221 on the constantly revolving shaft 220, which will thus impart rotary movement to the shaft 225, said rotary motion continuing until the lug or obstructing member 234 of the dog 228 is disengaged from the rollers 222 by the action of the trip bolt 230 assuming an obstructing position with reference to the engaging face of the dog 228.

It will be particularly noted that the pin 256 on the forwardly extending arm 248 of the cruciform lever J, when engaged by one of the arms 257 of the hub 258 on the rock shaft 147 is positively held and retained by said arm, thus retaining the lever J in a tilted position and the trip bolt 230 in a retracted position for a period of time until the rock shaft 147 swings in an opposite direction, such period being sufficient to enable the dumping mechanism to be restored to initial position, after the shock former has discharged and become disengaged from the shock.

For the purpose of supporting the sheaves or bundles the sides of the shock former are provided with bottom members or shelves 266, one at each side, said bottom members or shelves being supported by means of angular brackets or hangers 267 having upwardly extending arms 268 which are hingedly supported at 269 on the inner faces of the side members 148 of the shock former, as clearly seen in Figs. 23 and 33. The such a position that the lower edge of the chain will just clear the upper face of the arm M. One link of the chain 299 has a downwardly extending stud 302, and one of the chain links is provided just in advance of said stud with a laterally extending lug 303. The chain 299 is driven intermittently by the sprocket 241 on the shaft 235, which latter is intermittently operated by the mechanism provided for the purpose, as hereinbefore described. In addition to the operation being properly timed, the parts are to be so proportioned that the chain at each operation will complete exactly one circuit, so that the stud 302 and the lug 303 will stop precisely at the point from which they started. Initially, that is to say, when the bottom members 266 are projected beyond the lower edges of the side members of the shock former to the sheaf supporting position shown, for instance, in Fig. 23 of the drawings, the free end of the arm M extends in a forward direction with reference to the position of the bracket 289 upon which it is hingedly supported. In this position of the arm M the stud 302 is positioned in the V-shaped gap between the opposed ends of the plates 295, 296. Assuming that the chain is driven in the direction of the arrow, the stud 302 will engage the oblique edge 297 of the plate 295, thereby swinging the arm M until it assumes the position shown in Fig. 26, thereby rocking the T-shaped lever L and retracting the bottom members 266. This condition remains until the chain 299 has nearly completed its circuit, when the stud 302 will engage the rear edge of the plate 296, thereby operating to restore the arm M and the parts connected therewith to initial position, the stud 302 coming to a stop in the gap between the plates 295, 296, as seen in Fig. 23. The recess 292 in the body plate 290 of the arm M is of sufficient depth to accommodate the stud 302 during the operation just described.

Supported for oscillation in bearings 304 on the inner faces of the side members of the shock former are rock shafts 305, see Figs. 23 to 27, the lower ends of which are provided with cranks 306 that are connected together by a link 307, whereby when movement in one direction is imparted to either rock shaft, a corresponding movement will be conveyed to its mate on the opposite side member of the shock former. The rock shafts 305 are provided at their upper ends with cranks or arms 308 each having a stud or projection 309 lying adjacent to one of the connecting rods 255 that connect the ends of the movably supported cross bar 244 with the cranks 254 on the rock shafts 251 which latter carry the fingers or arms 252 that are adapted to project through the slots 253 so as to lie in the path of the sheaves forming the shock. The cranks of the rock shafts 251 and 305 are so positioned that when the fingers 252 are projected through the slots 253 to a position approximately at right angles to the faces of the sides of the shock former, the connecting rods 255 will be spaced apart from the studs 309; when, on the other hand, the fingers 252 are retracted, the rods 255 will be positioned closely contiguous to the studs 309. The arm or crank 306 of one of the rock shafts 305 is so positioned as to lie in the path of the lug 303 of the chain 299. Now, when either of the rock shafts 251 is oscillated by the action of a sheaf or bundle engaging an arm or finger 252 of such rock shaft, and the crank 254 of such rock shaft is thrown past center, as hereinbefore described, the connecting rod 255 connected at one end with such crank will engage the stud 309 upon the crank 308 of one of the rock shafts 305 which rock shaft, together with its mate, on the opposite side of the shock former, will be turned to the position indicated in Fig. 27 of the drawings, where the crank 306 of one of said rock shafts will be disposed in the path of the lug 303. It is immaterial which of the rock shafts 251 is first actuated to produce this action. When the second rock shaft 251 is actuated in its turn, the rod 255, one end of which is connected with a crank 254 of said rock shaft, is moved to a position corresponding with that of its mate at the opposite side of the shock former. When the chain 299 is thrown in operation, and when such chain has nearly completed its circuit, the lug 303 will engage one of the cranks 306 with the result of actuating both rock shafts 305. The studs 309 on the cranks 308 of said rock shafts will strike the connecting rods 255 and force said rods in the direction of each other with the result of rocking the shafts 251 with the cranks 254 to which said rods are connected sufficiently to bring said cranks 254 past center with reference to the rods 255, the oscillatory movement of the rock shafts 251 being completed by the action of the spring 264 which retracts the movably supported cross bar 244 with which the forward ends of the rods 255 are connected. The rear ends of said rods 255 having the heads 263 being thus moved rearwardly, the trip bolt 230 will be projected by its actuating spring 259 into the path of the dog 228 which will thus be thrown out of the path of the rollers 222 on the disk 221 of the constantly rotating shaft 220, thus interrupting the operation of the shaft 225 and the parts actuated thereby, including the shaft 235 and related parts.

For the purpose of tilting the bars 175, 177 that support the sprockets over which pass the chains 184, 185 carrying the bundle distributing fingers I so as to disengage said fingers from between the bundles in order to enable the shock to be deposited on the ground, the following mechanism is provided: The bars 175, 177 are provided with outwardly extending arms or brackets 310, 311, see Figs. 1, 3, 33 and 42, the outer extremities of said bars or brackets being connected together by means of rods 312 which are pivotally connected therewith. The arms 311 and the rods 312 have been shown as being bent to escape contact with other parts of the mechanism. The top frame of the shock former is provided with cross bars 313 that connect the side members 11 of said top frame, and said cross bars serve to support levers N having outwardly extending arms 314 which are connected by links or rods 315 with the arms or brackets 310. The levers N also have inwardly extending slightly upturned arms 316 with which are pivotally connected the outer ends of links 317, the inner ends of which have slots 318 engaging the pivot member 319, see Fig. 14, whereby said links are connected together and with the upper end of a rod 320, the lower end of which is pivotally connected with the forwardly extending arm 286 of the T-shaped lever L which has been previously described. The brace formed by the links 317 is capable of breaking upwardly, as shown in Fig. 3, and downwardly, as shown in Fig. 33, and it will be seen that when the lever L is actuated to move the rod 320 in a downward direction, said rod will actuate the levers N by means of the links 317 to move the outer ends of said levers upwardly from the initial position shown in Fig. 3 to the position shown in Fig. 33, thereby exerting upward stress on the arms or brackets 310, 311, and tilting the bars 175, 177 to move the fingers I extending outwardly from the chains 184, 185 in an upward direction, while the members extending inwardly from said chains will be tilted downwardly, this condition being brought about by the construction of the shafts H, H' of flexibly jointed sections. The levers N are provided with wide fulcrum portions having longitudinal slots 321, thus enabling fulcrum pins 322 of considerable length to be used and thereby insuring stability and strength. The motion of the levers in the operation of the device is also steadied by a link or brace member 323 pivoted on the fulcrum pin of one of the levers and having a slot 324 that engages the pivot member 319, by which the brace links 317 are connected with each other and with the rod 320. The operation of the levers N is assisted by means of coiled pull springs 325 that connect the outer ends of said levers with the cross bars 313, said springs being also arranged so as to exert a slight stress on the outer ends of the levers when lowered to the position shown in Fig. 3, thereby serving to lock said levers to retain the parts connected therewith in operative position. The stress exerted by the springs 325 on the levers N when the outer ends of the latter are lowered should not, however, be so powerful as to interfere with the free working of the device when the lever L is actuated.

It will be noted by reference to Fig. 1 that the bundle distributing chains 184, 185 carrying the fingers I do not extend back the full length of the side members 148 of the shock former, but permit one bundle to be carried back past the rear ends of the chains. This is in order to make provision for slanting the rear bundle on each side endwise with the shock formed, so that said end bundles may brace the shock from falling in a rearward direction. To provide means for thus tilting or slanting the rear bundle the bars 175 and 177 have their rearward ends extended beyond the rear shaft H' on each side of the machine; the lower bar 177 which extends to a point near the rear edge of the side of the shock former is bent in an inward direction to form a finger 326 between which and the rearmost sheaf engaging finger I on the chain 185 there is a space exceeding the distance between proximate fingers carried by said chain. The bar 175 terminates some distance in front of the rear edge of the side of the shock former, and it has an inturned finger 327 between which and the rearward sheaf engaging finger of the chain 184 there is a space slightly less than the distance between proximate fingers carried by said chain. When the rear bundle on either side of the shock former is pushed by the fingers I of the distributing chains 184, 185 to a point beyond the rear ends of said chains, the top of the bundles is retarded by the top stationary finger 327, and the butt is advanced to a more rearward point against the lower stationary finger 326, thereby slanting the upper end of the bundle in a forward direction. When the bundles constituting a shock are dropped, and the bundle engaging fingers I are moved downwardly, together with the bundles, the fingers 327 and 326 assist the operation by holding the rear bundle in position and depositing it at the proper slant to brace the rear end of the shock.

For the purpose of disposing the forward bundles of the shock at the proper slant to prevent the shock from falling in a forward direction, the following instrumentalities are provided: Connected with the bar 177 on each side of the machine near the front end thereof and extending upwardly therefrom is a plate or bracket 326' having lugs or ears 327' wherein a shaft 328 is supported for rotation, said shaft carrying a miter gear or segment 329 and an arm 330, as best seen in Figs. 34, 35 and 36. The plate or bracket 326' also carries a miter gear or segment 331 meshing with the gear or segment 329, and said miter gear 331 which is mounted for rotation on the plate 326' also carries a radially extending arm 332. The arm 330 which is associated with the shaft 328 is connected by a link 333 with a lug or projection 334 connected with and extending from the bar 175. When the parts of the device are in position for advancing sheaves of grain along the sides of the shock former, as in Fig. 34, the plate or bracket 326' extends from the bar 177 upwardly in the direction of the bar 175. When the bars 177 and 175 are tilted for the purpose of discharging a shock, the plate or bracket 326' will be turned down in the direction of the proximate side of the shock former to the position indicated in Fig. 36. The link 333 operates to partially rotate the shaft 328 carrying the miter gear 329 which meshes with and partially rotates the miter gear 331, swinging the arm 332 which is connected with the last mentioned miter gear about the axis of said miter gear 331. The arm 332 thus partakes of a two-fold movement, being moved with the plate or bracket 326' from an approximately vertical to an approximately horizontal position, while by the action of the intermeshing miter gears it is caused to swing in a plane approximately at right angles to the movement of the plate or bracket 326'. It is further to be understood that the parts are to be so arranged that the movement of the free end of the arm 332 will be in a rearward direction with reference to the side of the shock former adjacent to which it is located. Said arm will thus engage and press against the front side of the front sheaf on that side of the shock. The sheaf, during the actuation of the arm 332, being in process of being lowered to the ground, it will be the upper portion of the sheaf that is eventually engaged by the arm and pressed in a rearward direction, thus slanting the said sheaf properly to brace and reinforce the shock at the front end. The bars 175 and 177 at each side of the shock former are provided with upwardly extending arms 335, 336, each bar being provided with at least two such arms to support a rod or guide rail 337, 338. The rear ends of these guide rods or rails are bent or curved, as best seen in Fig. 1, at 339, 340, so as to project in an upward direction when the shock is being assembled upon the shock former. When the parts of the mechanism are actuated for the purpose of discharging the shock, and the bars 175, 177 are tilted with this end in view, the guide rods or rails will be moved in the direction of the sides of the shock former and will serve to exert pressure downwardly and in the direction of the sides of the shock former upon the sheaves which will thus be prevented from dropping promiscuously by gravity, being on the contrary supported and guided while moving in a downward direction until the butts of said sheaves reach and rest upon the ground. Extending rearwardly from the shock former, and connected rigidly with the frame structure of the machine, is a shock centering arm 341. When the shock has been deposited on the ground, and the machine advances from the shock, the curved rear ends of the guide rods or rails 337, 338 will tend to press or force the sheaves forming the two sides of the shock in the direction of each other, and at this time the shock centering arm will obstruct the sheaves on either side of the shock to prevent their being forced too far to either side, the result being that the shock will be left in perfect condition and evenly and thoroughly braced. It is obvious that the curved ends 339, 340 of the guide rods 337, 338 should be reasonably resilient, which may be readily accomplished by forming said rods of suitable resilient wire, the ends being bent to proper shape, as shown. The guide rods or rails also serve an important function in preventing the sheaves from contact with the fingers I of the distributing chains while the shock is being discharged or left behind by the machine.

Guided around each side wall or side member 148 of the shock former is an endless chain 342, said chains being supported on the sprockets 239, 240 of the shafts 225, 235 at the rear end of the shock former, and said chains being guided over idlers 343 which are supported for rotation adjacent to the rear ends of slots 344 which are formed in the sides of the shock former near the front ends thereof. The shafts 225, 235 being provided with the intermeshing pinions 237, 238 which are of the same size, it follows that said shafts, as well as the chains 342, will be driven in opposite directions, the movement of the outer leads of said chains being rearward with reference to the sides of the shock former. The sides of the shock former are provided with grooves or channels 345 wherein the chains are guided, said chains being thus sunk below the faces of the side members 148, as will be best seen in Fig. 39. Secured to each of the chains 342, an equal distance apart with respect to the whole length of the chain and dividing said chain into two equal parts, are the shock steadying fingers 346. The fingers which are hingedly connected with lugs 347 associated with the chains by means of pins or pivot members 348 are each provided with a shoe 349 engaging and riding upon the surface of the side member of the shock former adjacent to the groove or channel wherein the chain is accommodated, thereby sustaining the finger in a position approximately at right angles to the face of the side of the shock former and preventing it from yielding to pressure against the rear edge thereof when it engages the shock for the purpose of assisting in discharging the latter, as will be presently described. When the chain 342 at each side of the shock former is at rest, that is to say, while a shock is being accumulated, one finger will be positioned just inside of the slot 344 or adjacent to the inner face of the side of the shock former, while the other finger will extend rearwardly from the shock former. When the tripping mechanism is actuated for the purpose of discharging the shock, the shafts 225, 235 will be rotated, thus driving the chains in the proper direction and causing one finger 346 to traverse each side of the shock former in a rearward direction, pressing or bearing against the foremost sheaf of the shock, and steadying the shock while the machine is passing forward, leaving the shock on the ground. The parts are obviously to be so proportioned that each of the chains 342 will be actuated just sufficient to move one finger from the foremost to the rearmost position and the other finger from the rearmost to the foremost position. In traversing the inner faces of the sides of the shock formers, the fingers being pivotally connected with the lugs 347 of the chain, are enabled to lie down flatwise against the chain, and the fingers will move in this prostrate position until the slots 344 near the front ends of the side members of the shock former are reached, when the fingers, after passing through said slots, will assume an upstanding position in which they are maintained by engagement of the shoe 349 with the outer face of the side member of the shock former. To prevent the finger 346 from falling in a rearward direction while it is being righted or while it is coming in contact with the bundles of the shock, there is provided a projection 350 on the lug 347 with which the finger is hingedly connected, see Fig. 40, said projection engaging a notch or slot 351 at the base of the finger.

It is obvious that the parts of the mechanism will be so proportioned that the chains 342 carrying the shock steadying fingers will move in timed relation with the movement of other parts of the mechanism, said chains carrying the shock steadying fingers traversing the outer faces of the side members of the shock former in a rearward direction opposite to that in which the harvester and the shocking machine is moving, but at the same rate of speed, so that said shock steadying fingers will move rearward just as fast as the harvester and shocker are traveling forward, keeping said shock steadying fingers practically stationary with respect to the shock that is being discharged, and thus serving to hold said shock perfectly steady while the machine is disengaging itself therefrom.

It will be seen that as the self binder binds a bundle, the bundle fork F advances to an approximately upright position, while the ejector arms of the self binder are making a one-quarter revolution, said bundle fork starting from the position shown in Fig. 8. During the next half revolution of the ejector arms, the fork returns to what may be regarded as its initial position, as seen in Fig. 1. At this point the fork remains stationary until the bundle from the binder deck is thrown under the tines of the fork. As the bundle is being discharged from the binder to the bundle pan or sheaf receiver, the bottom members 111, 124 are tilted upwardly to meet the bundle and to support it while it is being engaged by the tines of the fork, said bottom members serving to press the bundle securely upon the fork tines. At the same time, the sheaf engaging tongs will grasp the bundle and retain it securely in position. When the ejector arms of the binder again start their first one-quarter revolution, the bundle supported by the fork is advanced to an upright position. Here the bundle is released from the encircling tines of the sheaf engaging tongs and is held stationary until the arms of the rock shaft 147 have engaged said bundle and by pressing the series of tines on the fork sidewise move the bundle off the fork, or nearly so, at which point the fork member F starts back and rides to its horizontal position, receives another bundle and advances to the bundle engaging position where it stops. As the fork member is receding to receive another bundle, the previous bundle just delivered to the arms of the shaft 147 is being advanced through the wide portion of the bundle pan or sheaf receiver, and as the next bundle arrives from the binder deck, the previous bundle has passed to one side out of the path of the head of the bundle just being delivered into the pan or sheaf receiver. As the bundle thus being delivered is assuming its partially upright position, the arms of the shaft 147 are finishing their stroke, and the bundle distributing fingers I are engaging the previous bundle, and as the bundle being delivered from the binder stops in the act of being engaged by the fork, the previous bundle is moved on to the bottom member at one side of the shock former, the bundle distributing fingers I are engaging the said bundle, and the arms connected with the shaft 147 are receding from the bundle. When the partially uprighted bundle in the fork is advanced to an upright position, the arms of the shaft 147 advance from the side to which they have just delivered a bundle and engage the next bundle, pressing the series of tines of the fork in the opposite direction to that previously taken, that is to say, in the direction of the opposite side of the shock former. When the bundle has been nearly detached from the fork, the latter starts back, and the bundle in front of the arms of the shaft 147 keeps on its course and is delivered to the side of the shock former opposite to that at which the previous bundle was delivered, and into the grasp of the bundle distributing fingers I on that side, and as it is fully advanced the arms of the shaft 147 recede from the bundle, as in the previous instance. These operations are repeated until both sides of the shock former are filled with the desired predetermined number of bundles, when the tripping device is put into action by the rearmost bundles of the shock, as hereinbefore stated, and as the arms associated with the shaft 147 finish their stroke in advancing the last bundle, the trip mechanism so operates that the bottom members of the shock former are withdrawn from beneath the bundles and the latter drop to the ground, the butts of the bundles engaging the stubble of the field, and all the bundles being positioned in a slanting or braced position toward each other in the form of a long shock which may consist of ten, twelve, fourteen or any desired even number of bundles. As the bundle supporting bottom members withdraw from beneath the shock to allow the bundles to drop, the bundle distributing chains are tilted, the inwardly extending or sheaf engaging fingers moving downwardly with the dropping bundles to guide the shock and to assist the sheaves in assuming the proper upright position. As these fingers so assist and guide the bundles, they also withdraw themselves from between the bundles. At the same time the guide rods or rails 337, 338 will engage and press the sheaves of the shock into compact and perfect shape.

As the shock starts to drop, the chains carrying the steadying fingers 346 also start, and just at the instant that the butts of the shock hit the ground, the shock steadying fingers, one on each side, engage the front bundle on each side of the shock and follow the shock out of the shocker, stopping at a point a little past the rear end of the machine adjacent to the shock centering rod or arm. During the last three or four inches of the movement of the shock steadying fingers, the dumping mechanism is returned for repeated action, and just as the dumping mechanism is locked into sheaf receiving position, the operating mechanism of the shocking machine is thrown out of gear, and the shock steadying fingers come to a stop leaving the shock set up on the ground.

Having thus described the invention, what is claimed as new, is:—

1. A shocking machine comprising an oblong open-ended box-like sheaf receiving pan including a tiltable longitudinally concaved bottom member, a rigid shock former of A-shaped cross section adjacent to the receiving pan, and means including an axial member supported for orbital movement and an upending fork supported for oscillation thereon, said upending fork performing a downward and rearward stroke for transferring the sheaves from the receiving pan to the shock former.

2. A shocking machine comprising an oblong open-ended box-like sheaf receiving pan including a tiltable bottom member concaved longitudinally, a rigid shock former of A-shaped cross section adjacent to the receiving pan, and means including an axial member supported for orbital movement and a swinging fork member carried thereon for upending sheaves and transferring them from the receiving pan to the shock former.

3. A shocking machine comprising a sheaf receiver, a non-yielding rigid shock former of A-shaped cross section supported adjacent to the receiver, and means including an axial member supported for orbital movement and a swinging fork member carried thereon for upending sheaves and transferring them from the receiving pan to the shock former.

4. A shocking machine comprising a sheaf receiver, a rigid, non-yielding and relatively non-movable shock former of A-shaped cross section adjacent to the receiver, and means including an axial member supported for orbital movement and a swinging fork member carried thereon for transferring sheaves on the receiver to the shock former.

5. In a shocking machine, the combination with a sheaf receiver and a shock former supported adjacent to said receiver, said shock former being of A-shaped cross section and of rigid non-yielding construction, of means for transferring sheaves from the receiver to the shock former including an axial member supported for orbital movement and a swinging fork member carried thereon, said fork member including a handle, brackets carried thereby, and sheaf engaging tines pivoted on said brackets.

6. In a shocking machine, a sheaf receiver, a rigid shock former of A-shaped cross section adjacent to the sheaf receiver, a movably supported axial member, a swinging fork carried thereon for upending sheaves and transferring them from the sheaf receiver in the direction of the shock former, and means including jointed arms supported for swinging movement, and obstructing lugs positioned in the path of the sheaf engaging portions of said arms for transferring the sheaves from the fork alternately to opposite sides of the shock former.

7. A shocking machine comprising a sheaf receiver including hingedly supported bottom members, means for tilting said bottom members substantially at a right angle to one another, an elongated shock former of A-shaped cross section, and means for transferring sheaves from the receiver alternately to opposite sides of the shock former.

8. In a shocking machine, a sheaf receiver including bottom members which are hingedly supported adjacent to each other on axes extending transversely of the receiver, means for tilting said bottom members on their respective hinges to a position approximately at a right angle to one another, a shock former of A-shaped cross section, and means for transferring sheaves from the receiver alternately to opposite sides of the shock former.

9. The combination with a self binding harvester having an ejector shaft provided with radial arms, of a shocking machine comprising a sheaf receiver and a shock former, said sheaf receiver having an outer side wall substantially parallel to the ejector shaft, and an inner side wall extending beneath the grain deck of the binder; bell cranks pivoted on the ejector arms, and means for actuating said bell cranks to push the sheaves discharged from the binder beyond the point to which they would be moved by the ejector arms.

10. The combination with a self binding harvester, of a shocking machine comprising a sheaf receiver and a shock former, said sheaf receiver having inner and outer side walls, and means including members pivoted on the ejector arms of the binder for moving sheaves discharged from the binding mechanism in the direction of the outer wall of the sheaf receiver to a point beyond that to which such sheaves would be moved by the ejector arms of the binding mechanism.

11. The combination with a self binding harvester having an ejector shaft provided with radial arms, of a shocking machine including a sheaf receiver and a shock former, said sheaf receiver having outer and inner side walls and hingedly supported bottom members; bell cranks pivoted on the ejector arms of the binder, and means for actuating said bell cranks to move sheaves discharged from the binder in the direction of the outer wall of the receiver.

12. A shocking machine comprising a sheaf receiver and a shock former, movably supported means on the sheaf receiver for supporting a sheaf received from the binder in a tilted position, means for transferring a sheaf from the receiver to the shock former, and means for actuating the sheaf supporting means to retract the same out of the path of the sheaf while being transferred.

13. The combination with a self binding harvester having a grain deck and an ejector shaft provided with radial arms, of a shocking machine comprising a sheaf receiver and a shock former, said sheaf receiver including an outer side wall, an inner side wall extending beneath the grain deck, and hingedly supported sheaf supporting bottom members; bell cranks pivoted on the ejector arms of the binder and having arms normally positioned approximately at right angles to the ejector arms, actuating springs for the bell cranks tending to maintain them in normal position, and means for actuating the bell cranks against the tension of the springs.

14. The combination with a self binding harvester having a grain deck and an ejector shaft provided with radial arms, of a shocking machine comprising a sheaf receiver and a shock former, said sheaf receiver including an outer side wall, an inner side wall extending beneath the grain deck, movably supported sheaf supporting bottom members, bell cranks pivoted on the ejector arms and having arms normally positioned approximately at right angles to said ejector arms, and other arms normally positioned approximately parallel to the ejector arms, springs tending to maintain the bell cranks in normal position, and means associated with the grain deck for obstructing those arms of the bell cranks which are normally approximately parallel to the ejector arms to tilt said bell cranks against the tension of the springs.

15. A shocking machine comprising a bottom frame having side members provided with offsets producing a relatively narrow front portion of said bottom frame, a shock former supported on the relatively wide portion of the bottom frame, said shock former being of A-shaped cross section, and a sheaf receiver supported on the relatively narrow front end and on the intermediate portion of the bottom frame between the offset portions of the side members, said sheaf receiver comprising a bottom pan, outer and inner side walls including curved portions disposed adjacent to the offset portions of the side members of the bottom frame and directed to the two sides of the shock former, and tiltably supported sheaf supporting members on the bottom of the pan; means for upending sheaves and for transferring the same from the sheaf supporting members past the curved side walls and to the sides of the shock former, and means for actuating the sheaf transferring means to deliver sheaves alternately at opposite sides of the shock former.

16. The combination with a self binding harvester, of a shocking machine including a bottom frame, supporting wheels, one at each side, on which said bottom frame is tiltably mounted, a sheaf receiver, and a shock former supported on said frame; a bracket hinged on the harvester frame for movement in a horizontal plane, means for connecting the front end of the shocker frame with said bracket for rocking and for swiveling movement, and a link connecting the binder deck of the harvester with a portion of the shocker frame intermediate the front and rear ends of the latter to maintain the shocker frame in relation to the binder deck at various adjustments of the latter.

17. The combination with a self binding harvester, of a shocking machine including a bottom frame, caster wheels supporting said frame, one at each side, means for raising and lowering the shocker frame with reference to the caster wheel adjacent to the grain binder, means for connecting the shocker frame with the binder deck for longitudinal adjustment with said binder deck and in constant relation thereto at various adjustments thereof and for rocking movement independently of the harvester frame, and means for securing the shocker frame in adjusted position with reference to the harvester frame.

18. The combination with a self binding harvester, of a shocking machine including a bottom frame, shocking mechanism supported thereon, caster wheels supporting the frame, one at each side, means for vertically adjusting one side of the frame with reference to its supporting wheel, means for connecting the shocker frame with the harvester frame for longitudinal movement in parallel relation thereto and for rocking movement independently of the harvester frame, a coiled pull spring exerting stress on the shocker frame in a forward direction with reference to the harvester frame, and means for connecting the shocker frame with the binder deck of the harvester for movement with said binder deck relatively to the harvester frame when said binder deck is adjusted to operate on straw of varying length.

19. A shocking machine comprising a bottom frame, an A-shaped shock former and a sheaf receiver including a movably supported sheaf tilting bottom member, a movably supported fork member to transfer sheaves from the receiver to the shock former, said fork member including pivotally supported sets of tines, and spring means engaging the sets of tines to hold them projecting yieldingly, normally in the direction of the shock former.

20. In a shocking machine, a sheaf receiver, a shock former of A-shaped cross section, a fork member supported for swinging movement in the direction of the shock former, said fork member including a handle member, arms extending laterally therefrom, and spring actuated sets of tines mounted pivotally on the arms and projecting normally in the direction of the shock former and movably supported means for engaging sheaves carried by the pivotally supported tines to direct such sheaves alternately to opposite sides of the shock former.

21. In a shocking machine, a movably supported sheaf transferring fork member comprising a handle having laterally extending arms, spring actuated sets of tines mounted on said arms, sheaf grasping tongs supported adjacent to some of the sets of tines, and means for actuating said tongs to grasp a sheaf when first engaged by the tines and to release said sheaf when in position to be discharged from the tines.

22. In a shocking machine, a sheaf receiver, a shock former of A-shaped cross section arranged in rear of the receiver, a fork member supported for swinging movement and including a handle having laterally extending arms, spring actuated sets of tines pivotally mounted on the arms, sheaf engaging tongs, a pivotally supported dog having an eye engaging the members of the tongs to open and close the latter, spring means engaging the dog and actuating the latter to hold the tongs normally in open sheaf receiving position, a spring actuated lever pivoted on and extending from the dog and adapted to break in one direction with reference thereto, and a cam member supported in the path of the spring actuated lever to obstruct the same, thereby actuating the dog when the fork swings in one direction.

23. In a shocking machine, a sheaf transferring fork supported for swinging movement, said fork including a handle having laterally extending arms, spring actuated sets of tines supported on each of the arms, pairs of sheaf engaging tongs supported on some of the arms and each comprising a pair of pivotally mounted tines crossing each other, a rod connecting a point on a tine of one pair of tongs with the corresponding tine of the other pair of tongs, actuating means for the tongs including pivotally supported spring actuated dogs having terminal eyes engaging the members of the tongs, one of said dogs being provided with an extension, a lever pivoted on the dog extension and having a lug engaging the dog and obstructing the movement of said lever in one direction, an actuating spring for said lever, and a cam supported in the path of the lever, adjacent to the path of the fork and obstructing said lever when the fork swings in one direction, thereby causing the members of the tongs to close together.

24. In a shocking machine, a sheaf transferring fork supported for swinging movement, said fork having sheaf engaging tines and sheaf engaging tongs, means for positively actuating the tongs including a spring actuated lever adapted to swing in one direction only, a cam plate supported in the path of said lever adjacent to the path of the fork and obstructing said lever when the fork swings in one direction, a slotted guide connected with the cam plate, and a hook member connected with the fork and engaging the slotted guide.

25. In a shocking machine, a shock former of A-shaped cross section, a sheaf receiver, a movable support, a sheaf transferring fork supported on said movable support for swinging movement toward and from the receiving end of the shock former, and means for actuating the fork intermittently with a distinct pause at the limit of the movement in either direction of sufficient duration to enable a sheaf to be engaged by or discharged from the fork, said fork including a handle, laterally extending arms and spring actuated tines pivoted on said arms; and movably supported means whereby sheaves carried by the tines are swung alternately in opposite directions for delivery to the shock former.

26. In a shocking machine, a shock former, a sheaf receiver, a sheaf transferring fork supported for swinging reciprocatory movement toward and from the receiving end of the shock former, and means for actuating the fork including a yoke supported for reciprocatory movement in an approximately horizontal plane, said yoke having a vertical slot, the side walls of which are provided with arcuate indented portions intermediate the ends thereof and a crank supported for rotation and having a wrist engaging the slotted yoke, whereby said yoke will be moved to actuate the fork when the wrist engages the non-indented portions of the side walls of the slot, the yoke remaining stationary while the indented portions are being traversed by the wrist.

27. In a shocking machine, a shock former of A-shaped cross section, a sheaf receiver, a sheaf transferring fork supported for swinging movement toward and from the receiving end of the shock former, and means for actuating the fork including a vertically slotted yoke having forwardly and rearwardly extending arms, pivotally mounted uprights pivotally connected to said arms, and a crank supported for rotation and having a wrist engaging the slotted yoke, the walls of the slot of said yoke being provided with indented portions to be traversed by the wrist, thereby causing at the limit of the movement of said yoke and the fork actuated thereby in either direction a pause of a duration determined by the extent of the indented portions of the side walls of the slot.

28. The combination with a self binding harvester having an ejector shaft, of a shocking machine adjustably and detachably connected with the harvester frame, said shocking machine including a shock former, a sheaf receiver, a sheaf transferring fork supported for swinging movement toward and from the sheaf receiver, and means for actuating the fork including a slotted yoke supported for reciprocation, a shaft having a crank provided with a wrist engaging the slotted yoke, and means for transmitting motion to said yoke from the ejector shaft of the binder including a telescopic shaft and universal joints.

29. In a shocking machine, a shock former of A-shaped cross section, a sheaf receiver arranged in front of the shock former, a sheaf transferring fork supported for swinging movement toward and from the front end of the shock former, and a vertical shaft supported for oscillation adjacent to the front end of the shock former and having radial members adapted to receive sheaves from the fork and to move such sheaves alternately to opposite sides of the shock former.

30. In a shocking machine, a shock former of A-shaped cross section, a sheaf receiver arranged in front thereof, a sheaf transferring fork supported for swinging movement toward and from the front end of the shock former, an oscillatory shaft supported adjacent to the front end of the shock former and having radially extending brackets, spring actuated arms pivotally connected with said brackets, and means for obstructing the inner ends of said arms as the shaft oscillates in either direction.

31. In a shocking machine, a shock former having inclined upwardly converging side members and bottom members movably supported adjacent to the lower edges of the side members, an approximately vertical shaft supported for oscillation adjacent to the receiving end of the shock former, said shaft being provided with a radially extending bracket, a spring actuated arm pivoted on said bracket, said arm having a forwardly extending sheaf engaging end and a rearwardly extending end, means for presenting sheaves to the front end of the shock former, said means comprising a fork member having pivotally supported spring actuated tines adapted to yield in opposite directions, obstructing means supported in the path of the rearwardly extending spring actuated arm on the bracket of the oscillatory shaft, and means for intermittently operating said shaft.

32. In a shocking machine, a shock former of A-shaped cross section having upwardly converging rigidly connected side members, hangers supported on the inner faces of the side members for swinging movement, bottom members supported on the hangers, and means for actuating the hangers to alternately retract and project the bottom members with reference to the lower edges of the side members, said bottom members being projected beneath the side members and outwardly from the same when in receiving position, the outward swinging movement of the hangers being limited by the side members of the shock former.

33. In a shocking machine, a shock former of A-shaped cross section comprising upwardly converging rigidly connected side members, hangers supported on the inner faces of the side members for swinging movement, bottom members mounted on the hangers, means for actuating the hangers to alternately retract and project the bottom members with reference to the lower edges of the side members, and means for locking the hangers and the bottom members in projected position; said retracting and projecting and locking means including a member movably supported between the side members of the shock former, a jointed brace connecting said member with the hangers and capable of breaking in two directions, and means for limiting the breaking movement of said brace in one direction.

34. In a shocking machine, a shock former of A-shaped cross section including upwardly converging rigidly connected side members, hangers supported on the inner faces of the side members for swinging movement, bottom members supported on the hangers, means for actuating the hangers to alternately retract and project the bottom members beneath and adjacent to the lower edges of the side members, said bottom members being projected outwardly with respect to the side members when in receiving position, and means for locking the hangers with the bottom members in projected position; in combination with means for moving sheaves along the side members to form a shock.

35. In a shocking machine, a shock former of A-shaped cross section including upwardly converging side members and movably supported bottom members, in combination with devices spaced from the outer faces of the side members for moving sheaves along said side members to form a shock, and means for intermittently actuating said devices.

36. In a shocking machine, a shock former of A-shaped cross section including upwardly converging side members and movably supported bottom members, carrying devices supported adjacent to and spaced from the outer faces of the side members for conveying sheaves along said side members to form a shock, and means whereby the carrying devices on opposite sides of the shock former will be alternately and intermittently actuated.

37. In a shocking machine, a shock former of A-shaped cross section including upwardly converging side members and movably supported bottom members, endless chains supported adjacent to and spaced from the outer faces of the side members, sheaf distributing fingers mounted equidistantly on the chains, and means for intermittently moving the chains a distance equal to the space between two proximate distributing fingers.

38. In a shocking machine, a shock former including upwardly converging side members and movably supported bottom members, endless chains supported adjacent to and spaced from the outer faces of the side members, sheaf distributing fingers on said chains, means for intermittently and alternately actuating the chains on opposite sides of the shock former, and means for retracting and projecting the bottom members with reference to the lower edges of the side members.

39. In a shocking machine, a shock former including upwardly converging side members and movably supported bottom members, endless chains adjacent to the outer faces of the side members, sheaf engaging fingers mounted equidistantly on said chains, supporting means for said chains including sprockets and bars on which said sprockets are supported, and means for tilting the bars and sprockets to change the angle of the sheaf engaging fingers with reference to the outer faces of the side members.

40. In a shocking machine, a shock former including upwardly converging side members and movably supported bottom members, shafts supported in approximately parallel relation to the inclined side members adjacent to the front and rear ends of the latter, each of said shafts being made up of a plurality of sections flexibly joined together, sprockets on some of the shaft sections, chains guided over the sprockets on the front and rear shafts and having sheaf engaging fingers, means for breaking the shafts to tilt the sprockets over which the finger carrying chains are guided, and means for intermittently rotating the shafts.

41. In a shocking machine, a shock former including upwardly converging side members and movably supported bottom members, means including movably supported sheaf engaging fingers for moving sheaves along the sides of the shock former, means for retracting the bottom members with reference to the lower edges of the side members, and means for tilting the sheaf engaging fingers downwardly when the bottom members are retracted.

42. In a shocking machine, a shock former including upwardly converging side members and movably supported bottom members, means including movably supported sheaf engaging fingers for moving sheaves along the sides of the shock former, means for intermittently and alternately actuating the fingers on opposite sides of the shock former, means including trip mechanism actuated by the positioning on the shock former of the last of a predetermined number of sheaves for retracting the movable bottom members with reference to the lower edges of the sides of the shock former, and means for tilting the sheaf engaging fingers downwardly when the bottom members are thus retracted.

43. In a shocking machine, a shock former including upwardly converging side members and movably supported bottom members, means including movably supported sheaf engaging fingers for moving sheaves along the sides of the shock former, movably supported guide rails spaced from the sides of the shock former, means including automatic trip mechanism for retracting the bottom members with reference to the lower edges of the side members upon the completion of a shock, and means for tilting the sheaf engaging fingers downwardly and the guide rails in the direction of the side members to exert lateral and downward pressure against the sheaves simultaneously with the retraction of the bottom members.

44. In a shocking machine, a shock former having upwardly converging side members and movably supported bottom members, means including movably supported sheaf engaging fingers for moving sheaves along the sides of the shock former, means for intermittently and alternately actuating the sheaf engaging fingers on opposite sides of the shock former, shock obstructing fingers supported in the path of the rearmost sheaves of the shock, means including automatically actuated trip mechanism for retracting the bottom members on the completion of the shock, and means for tilting the sheaf engaging fingers and the shock obstructing fingers downwardly simultaneously with the retraction of the bottom members.

45. In a shocking machine, a shock former including upwardly converging side members and movably supported bottom members, means including intermittently actuated endless chains and sheaf engaging fingers carried thereby for moving sheaves along the sides of the shock former, tiltably mounted supporting means for said chains, shock obstructing fingers connected with the chain supporting means, means including automatic trip mechanism for retracting the bottom members upon the completion of a shock, and means for tilting the chain supporting means simultaneously with the retraction of the bottom members.

46. In a shocking machine, a shock former including upwardly converging side members and movably supported bottom members, means for delivering sheaves alternately to opposite sides of the shock former, means including movably supported sheaf engaging fingers for moving the sheaves along the sides of the shock former, means for intermittently and alternately actuating the sheaf engaging fingers on opposite sides of the shock former, sheaf obstructing fingers supported in the path of the rearmost sheaves of the shock, movably supported guide rails spaced from the sides of the shock former, means including automatic trip mechanism for retracting the bottom members upon the completion of the shock, and means for tilting the sheaf engaging and the shock obstructing fingers downward and the guide rails in the direction of the side members of the shock former simultaneously with the retraction of the bottom members.

47. In a shocking machine, a shock former including upwardly converging side members and movably supported bottom members, movably supported guide rails spaced from the outer faces of the sides of the shock former, means for retracting the bottom members with reference to the lower edges of the side members to permit the shock to drop, and means for moving the guide rails downwardly and in the direction of the side members simultaneously with the retraction of the bottom members.

48. In a shocking machine, a shock former including upwardly converging side members and movably supported bottom members, movably supported guide rails spaced from the side members and having upwardly curved resilient shock engaging rear ends, means for retracting the bottom members with reference to the lower edges of the side members to permit the shock to drop, and means for tilting the guide rails downwardly and in the direction of the side members of the shock former simultaneously with the retraction of the bottom members, thereby placing the curved resilient rear ends of said guide rails in an approximately horizontal plane to engage the shock.

49. In a shocking machine, a shock former including upwardly converging side members and movably supported bottom members, chains supported adjacent to and spaced from the side members, and sheaf engaging fingers connected with said chains, each of said fingers comprising two members pivotally connected together at their outer ends and having their inner ends detachably connected with the chain.

50. In a shocking machine, a shock former including upwardly converging side members and movably supported bottom members, a frame structure supporting the same, alternately and intermittently actuated shafts supported adjacent to the front end of the frame structure, one at each side of the shock former, universal joints at the lower ends of said shafts, shafts suspended from said universal joints, one at each side of the shock former, said suspended shafts being each composed of a plurality of flexibly connected sections including two sprocket carrying sections and an intermediate section between said sprocket carrying sections, movably supported swinging brackets having bearings for said intermediate shaft sections, shafts suspended from the frame structure adjacent to the rear end of the shock former, one adjacent to each side of such shock former, each of said shafts comprising a plurality of sections flexibly joined together and including two sprocket carrying sections and an intermediate section, movably supported swinging brackets having bearings for said last named intermediate sections, sprockets fixed on the sprocket carrying sections of the shafts at the forward ends of the frame structure, sprockets journaled on the sprocket carrying sections of the shafts at the rear ends of the frame structure, longitudinal bars, bearing sleeves engaging the hubs of the fixed sprockets on the forward shaft and the hubs of the loose sprockets on the rearward shaft at each side of the machine, chains guided over the sprockets on the forward and rear shafts at each side of the machine, said chains having sheaf engaging fingers, means including automatic trip mechanism for retracting the movable bottom members of the shock former to permit a shock to drop and for again projecting said bottom members during an intermission between the movement of the intermittently rotating shafts, and means for tilting the bars having sleeves engaging the hubs of the chain carrying sprockets to tilt said chains, and for restoring said bars to initial position, simultaneously with the retraction and projection of the bottom members.

51. A shocking machine including a shock former having upwardly converging side members and movably supported bottom members, means for transferring sheaves from the binder alternately to opposite sides of the shock former, movably supported means for moving the sheaves intermittently in a rearward direction along the sides of the shock former, means for retracting and projecting the bottom members with reference to the lower edges of the side members, means for tilting the sheaf moving members to follow the movement of the sheaves when the bottom members are retracted to deposit the shock, and movably supported means for pressing the sheaves in the direction of the side members of the shock former to assist and regulate the downward movement of the sheaves.

52. A shocking machine including a wheel supported frame, a shock former mounted on the frame and having upwardly converging side members and movably supported bottom members, means for retracting and projecting the bottom members with reference to the lower edges of the side members, a shock centering arm projecting rearwardly from the shock former, movably supported rods having curved resilient ends extending rearwardly of the shock former, and means for moving said rods downwardly and in the direction of the side members of the shock former concurrently with the retraction of the bottom members for the purpose of depositing a shock.

53. A shocking machine including a shock former having upwardly converging side members and movably supported bottom members, means for retracting and projecting the bottom members with reference to the lower edges of the side members, means for transferring sheaves from the reaper to the shock former, means for moving the sheaves rearwardly on the shock former, means for automatically tripping the bottom retracting and projecting mechanism when a predetermined number of sheaves have been placed on the shock former and moved to discharging position thereon, and means for engaging the rear and front sheaves of the shock to slant the upper ends of the rear sheaves forwardly and the upper ends of the forward sheaves rearwardly concurrently with the retraction of the bottom members for the purpose of depositing a shock.

54. In a shocking machine, a shock former including upwardly converging side members and movably supported bottom members adapted to support two rows of sheaves with the upper ends of said sheaves tilted toward each other, in combination with means for tilting the upper ends of the front and rear sheaves of each row toward each other.

55. In a shocking machine, a shock former having upwardly converging side members and movably supported bottom members adapted to support two rows of sheaves with the upper ends of said sheaves tilted toward each other, means for depositing sheaves alternately on opposite sides of the shock former adjacent to the front end of the latter, intermittently operable means for moving the rows of sheaves rearwardly along the sides of the shock former until a predetermined number has been placed on each side, means including automatic trip mechanism actuated by the rearmost sheaves for retracting and again projecting the bottom members, and means operable concurrently with the retraction of the bottom members for pressing the upper ends of the rows of sheaves downwardly and in the direction of the side members of the shock former and the upper ends of the rear and front sheaves of each row in the direction of each other.

56. In a shocking machine, a shock former including upwardly converging side members and movably supported bottom members, means for retracting and projecting the bottom members with reference to the lower edges of the side members, and trip mechanism for said actuating mechanism including rock shafts supported on the inner faces of the side members of the shock former, arms projecting from said rock shafts through the side members, a movably supported element connected with the rock shafts and movable by the successive actuation of said shafts from an initial to a secondary position, a lever supported on said movable member and having an engaging end located in the path of the actuating element when the secondary position of the movable member is attained, and a trip bolt actuated by said lever.

57. A shocking machine including a shock former having upwardly converging sides and movably supported bottom members, mechanism for retracting and projecting the bottom members with reference to the lower edges of the sides, and means for transmitting motion from the harvester gearing to said retracting and projecting mechanism including a constantly driven shaft having a disk carrying a roller mounted for rotation about an axis parallel to but spaced from the axis of the shaft, a second shaft supported for rotation in alinement with the constantly rotating shaft and having a disk, a dog pivoted on said disk, a spring projected trip bolt adapted to obstruct the dog, a spring actuating the dog when the trip bolt is retracted to place the face of the dog in the path of the roller carried by the disk of the constantly rotating shaft, and means for retracting the trip bolt.

58. A shocking machine including a shock former having upwardly converging side members and movably supported bottom members, mechanism for retracting and projecting said bottom members with reference to the lower edges of the side members, and means for intermittently actuating said mechanism including a constantly driven shaft connected with and driven by the harvester train, a second shaft operated intermittently by the constantly rotating shaft, a trip bolt governing the mechanism whereby the second shaft is intermittently driven by the constantly rotating shaft, and means for actuating said trip bolt when a predetermined number of bundles have been placed on the shock former.

59. A shocking machine including a shock former having upwardly inclined side members and movably supported bottom members, mechanism for retracting and projecting said bottom members with reference to the lower edges of the side members, and means for actuating said retracting and projecting mechanism including a shaft connected with and constantly driven by the harvester train, a second shaft alining with and operable intermittently by the constantly driven shaft, a movably supported spring actuated trip bolt controlling the starting and the stopping of the intermittently operating shaft, an oscillatory shaft having radial arms, a movably supported member, a lever on said member having an arm adapted to be gradually advanced by a step by step movement of the movably supported member into the path of an arm of the oscillatory shaft, laterally extending arms on said lever, rods extending from said laterally extending arms and connected slidably with the trip bolt, means for advancing the movable lever carrying member in the direction of the oscillatory shaft when the full complement of sheaves has been placed on one side of the shock former without bringing the lever within the path of the arms of the oscillatory shaft, and means for moving the other end of the movable lever carrying member in the direction of the oscillatory shaft when the full complement of sheaves has been placed on the other side of the shock former, thereby so advancing the lever carrying member as to place the lever in the path of an arm of the oscillatory shaft and at the same time so advancing the slidable ends of the connecting rods with reference to the trip bolt as to cause said trip bolt to be retracted when the lever is actuated by one of the arms of the oscillatory shaft.

60. A shocking machine including a shock former having upwardly converging side members and movably supported bottom members, bottom supporting hangers supported hingedly on the inner faces of the side members, hingedly connected brace links pivotally connected with two opposite hangers, a guide rod connected with the hingedly connected brace links and having a slotted head and an enlargement at its lower end, a stationary brace through which the rod is guided to limit the movement thereof, a lever having an arm engaging the slotted head of the guide rod, and a downwardly extending arm, spring means to assist in retracting the bottom members, a hingedly supported bracket, a rod connecting said bracket with the downwardly extending arm of the lever, a shaft driven constantly by the harvester train, a second shaft driven intermittently by the constantly rotating shaft, a chain driven by the intermittently rotating shaft, and means associated with the chain for actuating the hingedly supported bracket to rock the lever, thereby retracting and projecting the movably supported bottom members when a predetermined number of sheaves have been placed on the shock former.

61. In a shocking machine, a shock former having upwardly inclined side members and movably supported bottom members, means for retracting and projecting the bottom members when a predetermined number of sheaves have been placed on the shock, shock steadying fingers supported movably on the sides of the shock former and movable longitudinally thereof, and means for operating the shock steadying fingers concurrently with the retraction of the bottom members.

62. In a shocking machine, a shock former having upwardly converging side members and movably supported bottom members, means for retracting and projecting the bottom members when a predetermined number of sheaves have been placed on the shock former, chains supported on the side members of the shock former and surrounding each of said side members, shock steadying fingers carried by said chains, and means for actuating the chains concurrently with the retraction of the bottom members.

63. In a shocking machine, a shock former having upwardly converging side members and movably supported bottom members, means for retracting and projecting the bottom members with reference to the lower edges of the side members when a predetermined number of sheaves have been placed on the shock former, longitudinally disposed chains supported on the side members of the shock former and surrounding each of said side members, shock steadying fingers carried by the chains, driving sprockets for said chains, shafts supporting the driving sprockets and having intermeshing pinions whereby said shafts will operate simultaneously in opposite directions, and means for intermittently rotating one of said shafts concurrently with the retraction of the bottom members.

64. In a shocking machine, a shock former including upwardly inclined side members having longitudinal T-shaped grooves in their outer faces and slots through the front ends of said grooves, endless chains guided through said grooves and along the inner faces of the side members, supporting sprockets for the chains adjacent to the rear ends of the slots, driving sprockets for the chains adjacent to the rear end of the shock former, shafts supporting said driving sprockets and having intermeshing pinions, fingers connected pivotally with the chains and having shoes adapted to engage the outer faces of the shock former, movably supported bottom members, means for retracting and projecting said bottom members when a predetermined number of sheaves have been placed on the shock former, and means for intermittently actuating one of the shafts carrying the chain driving sprockets concurrently with the retraction of the bottom members.

65. In a shocking machine, a shock former having upwardly converging side members and movably supported bottom members, means for retracting and projecting the bottom members when a predetermined number of sheaves have been placed on the shock former, movably supported fingers spaced from the sides of the shock former for distributing sheaves along said sides, movably supported shock steadying fingers mounted on and extending from the sides of the shock former, means for retracting and projecting the bottom members to deposit the shock when a predetermined number of sheaves have been placed on the shock former, and means operable concurrently with the retraction of the bottom members for tilting the distributing fingers and for actuating the shock steadying fingers.

66. In a shocking machine, a shock former having movably supported bottom members for supporting two rows of sheaves in oppositely tilted position, a shock centering arm extending rearwardly from the shock former, movably supported means for distributing sheaves along the sides of the shock former, means for retracting the bottom members when a predetermined number of sheaves have been placed on the shock former, movably supported shock steadying means carried by the shock former and adapted to engage the front end of the shock, and means for intermittently actuating the shock steadying means at a speed equal to that at which the shocking machine moves in a forward direction, concurrently with the retraction of the bottom members.

67. A shocking machine including a shock former having upwardly converging side members and movably supported bottom members, means for transferring sheaves from the binder alternately to opposite sides of the shock former, movably supported means including fingers spaced from the sides of the shock former for distributing the sheaves along the sides, movably supported guide members spaced from the sides of the shock former and having curved resilient ends extending rearwardly of the shock former, sheaf obstructing means supported in the path of the rearmost sheaves of the shock to tilt the upper end of said sheaves in a forward direction, movably supported sheaf tilting means adapted to engage the forward sheaves of the shock to tilt the upper ends of said sheaves in a rearward direction, a sheaf centering arm extending rearwardly from the shock former, mechanism for retracting and projecting the bottom members with reference to the lower edges of the sides of the shock former when a predetermined number of sheaves have been placed thereon, means for tilting the sheaf distributing fingers and sheaf obstructing fingers to permit the shock to drop when the bottom members are retracted and for simultaneously tilting the guide members downwardly and in the direction of the side members to engage and steady the sheaves while the shock is descending, movably supported shock steadying fingers carried by the sides of the shock former and adapted to engage the forward sheaves of the shock, and intermittently operable means for actuating the shock steadying members to move the same rearwardly along the sides of the shock former at a speed equal to that at which the shock former is moving in a forward direction concurrently with the retraction of the bottom members to deposit a shock.

In testimony whereof I affix my signature in presence of two witnesses.

JESSE E. GRIFFITH.

Witnesses:
J. A. GEE,
FRANCES E. DOTEN.

---

Copies of this patent may be obtained for five cents each, by addressing the "Commissioner of Patents, Washington, D. C."